US010827359B2

(12) United States Patent
Cherian et al.

(10) Patent No.: US 10,827,359 B2
(45) Date of Patent: Nov. 3, 2020

(54) MECHANISM FOR GROUPING A NEIGHBORING ACCESS POINT (AP) IN A SPATIAL REUSE GROUP (SRG)

(71) Applicant: QUALCOMM Incorporated, San Diego, CA (US)

(72) Inventors: George Cherian, San Diego, CA (US); ALfred Asterjadhi, San Diego, CA (US); Abhishek Pramod Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/235,302

(22) Filed: Dec. 28, 2018

(65) Prior Publication Data
US 2019/0208423 A1 Jul. 4, 2019

Related U.S. Application Data

(60) Provisional application No. 62/613,367, filed on Jan. 3, 2018.

(51) Int. Cl.
H04W 16/06 (2009.01)
H04W 76/11 (2018.01)
(Continued)

(52) U.S. Cl.
CPC ........... *H04W 16/06* (2013.01); *H04W 16/10* (2013.01); *H04W 16/28* (2013.01); *H04W 24/08* (2013.01);
(Continued)

(58) Field of Classification Search
CPC ..... H04W 16/06; H04W 16/10; H04W 76/11; H04W 16/28; H04W 40/244;
(Continued)

(56) References Cited

U.S. PATENT DOCUMENTS

2017/0255659 A1* 9/2017 Cariou ................. G09G 5/393
2019/0313328 A1* 10/2019 Ma ....................... H04W 16/14

OTHER PUBLICATIONS

Cariou L (Intel): "CR for 25.9.2.2 OBSS_PD Spatial Reuse", IEEE Draft, 11-17-0267-05-00AX-CR-FOR-25-9-2-2-OBSS-PD-Spatial-Reuse, IEEE-SA Mentor, Piscataway, NJ USA, vol. 802.11ax, No. 5, Mar. 15, 2017 (Mar. 15, 2017), pp. 1-21, XP068115261 ,Retrieved from the Internet:URL:https://mentor.ieee.org/802.11/dcn/17/11-17-0267-05-00ax-cr-for-25-9-2-2-obss-pd-spatial-reuse.docx [retrieved on Mar. 15, 2017], Paragraph [9.4.2.226].
(Continued)

*Primary Examiner* — Jae Y Lee
(74) *Attorney, Agent, or Firm* — Steven R. Thiel

(57) ABSTRACT

This disclosure provides systems, methods, and apparatus, including computer programs encoded on computer-readable media, for enabling a neighboring access point (AP) to reuse communication resources that are used by an existing spatial reuse group (SRG). In one aspect, an SR element including SR information can be generated. The SR information may indicate that a first group of STAs associated with a second AP may reuse resources of a wireless medium over which packets are transmitted by a second group of STAs associated with the first AP and may indicate a permitted OBSS threshold value for reuse of the resources over the first AP. In some implementations, a wireless apparatus may transmit the SR element that includes the SR information.

30 Claims, 10 Drawing Sheets

(51) Int. Cl.
   *H04W 16/28*  (2009.01)
   *H04W 40/24*  (2009.01)
   *H04W 48/16*  (2009.01)
   *H04W 72/08*  (2009.01)
   *H04W 88/10*  (2009.01)
   *H04W 48/10*  (2009.01)
   *H04W 24/08*  (2009.01)
   *H04W 16/10*  (2009.01)
   *H04W 72/04*  (2009.01)

(52) U.S. Cl.
   CPC ......... *H04W 40/244* (2013.01); *H04W 48/10* (2013.01); *H04W 48/16* (2013.01); *H04W 72/082* (2013.01); *H04W 76/11* (2018.02); *H04W 88/10* (2013.01); *H04W 72/0426* (2013.01)

(58) Field of Classification Search
   CPC ... H04W 48/16; H04W 72/082; H04W 88/10; H04W 48/10; H04W 24/08; H04W 72/0426

See application file for complete search history.

(56) References Cited

OTHER PUBLICATIONS

International Search Report and Written Opinion—PCT/US2018/068175—ISA/EPO—dated Mar. 6, 2019.
Liu J (MEDIATEK INC) et al., "Considerations on OBSS Spatial Reuse", IEEE Draft, 11-14-1435-00-00AX-Considerations-on-OBSS-Spatial-Reuse, IEEE-SA Mentor, Piscataway, NJ USA, vol. 802.11ax, Nov. 3, 2014 (Nov. 3, 2014), XP068118065, pp. 1-8, Retrieved from the Internet: URL:https://mentor.ieee.org/802.11/dcn/14/11-14-1435-00-00ax-considerations-on-obss-spatial-reuse.pptx [retrieved on Nov. 3, 2014].

* cited by examiner

| OBSS TX Max 224 | OBSS PD Min 226 | OBSS PD Max 228 | SRG BSS Color Bitmap 230 | SRG Partial BSSID Bitmap 232 | SRG Identifier 234 |

SR Element 222

FIG. 2C

MECHANISM FOR GROUPING A NEIGHBORING ACCESS POINT (AP) IN A SPATIAL REUSE GROUP (SRG)

CROSS-REFERENCE TO RELATED APPLICATION

This application claims the benefit of U.S. Provisional Application Ser. No. 62/613,367, entitled "A Mechanism for Grouping a Neighboring Access Point in a Spatial Reuse Group" and filed on Jan. 3, 2018, which is expressly incorporated by reference herein in its entirety.

TECHNICAL FIELD

This disclosure relates generally to communication systems, and more particularly to enabling a first access point (AP) to reuse a wireless communication medium over a second AP.

DESCRIPTION OF THE RELATED TECHNOLOGY

In some telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching or routing techniques used to interconnect the various network nodes and devices (such as circuit switching versus packet switching), the type of physical media employed for transmission (such as wired versus wireless), and the set of communication protocols used (such as Internet protocol suite, Synchronous Optical Networking (SONET), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc., frequency bands. Wireless networks advantageously facilitate user mobility and rapid field deployment when compared to fixed wired networks.

A wireless network, for example a WLAN, such as a Wi-Fi (i.e., IEEE 802.11 family of standards) network may include an AP that communicates with one or more stations (STAs) or mobile devices. The AP may be coupled to a network, such as the Internet, and may enable a wireless device to communicate via the network (or communicate with other devices coupled to the AP). A wireless device may communicate with a network device bi-directionally. For example, in a WLAN, a STA may communicate with an associated AP via downlink (DL) and uplink (UL). The DL (or forward link) may refer to the communication link from the AP to the station, and the UL (or reverse link) may refer to the communication link from the station to the AP.

SUMMARY

The systems, methods and devices of this disclosure each have several innovative aspects, no single one of which is solely responsible for the desirable attributes disclosed herein. In an aspect of the disclosure, a method, a computer-readable medium, and an apparatus are provided. In some implementations, the apparatus may include a first AP in a Spatial Reuse Group (SRG). The apparatus may generate a spatial reuse (SR) element that includes SR information. In some implementations, the SR information may indicate that a first group of STAs associated with a second AP may reuse resources that are used for packets transmitted by a second group of STAs associated with the first AP and may indicate at least one first permitted overlapping BSS (OBSS) threshold value for reuse the resources over the first AP. The apparatus may transmit the SR element that includes the SR information.

In some implementations, the SR element may be carried in one of a beacon, a probe response, an action frame, a beacon report request, or a beacon report response.

In some implementations, the SR element may include an SRG identifier field. As an example, an SRG identifier associated with the first AP may be included in the SRG identifier field when the first permitted OBSS threshold value(s) included in the SR information is associated with a plurality of different SRGs.

In some implementations, the SR element may be an SR permission element.

In some implementations, the SR information may be included in an SR parameter element set.

In some implementations, the SR information may indicate a partial basic service set identification (BSSID) bitmap.

In some implementations, the SR information may indicate color information for at least an SR group including the first AP.

In some implementations, the apparatus may receive a first message from the second AP, the first message indicating that the second AP intends to reuse the resources with the first AP. The apparatus may then include the second AP in an SRG associated with the first AP.

In some implementations, the apparatus may receive a first message from the second AP, the first message indicating at least one second OBSS threshold value for reuse of the resources over the second AP. The apparatus may then update the at least one first permitted OBSS threshold value to match the at least one second OBSS threshold value and transmit a second message to the second AP indicating the updated at least one first permitted OBSS threshold value.

In some implementations, the apparatus may an SR information request from the second AP, wherein the SR element is generated in response to the SR information request.

In some other implementations, the apparatus may include a neighboring AP that is not part of an SRG. The apparatus may receive, from a second AP, an SR element that includes SR information. In some implementations, the SR information including at least one first permitted OBSS threshold value for reuse of resources that are used for packets transmitted by the second AP. Such reuse of resources may be described as reuse over the second AP. The apparatus may determine if the at least one first permitted OBSS threshold value meets a transmission criterion. The apparatus may transmit information associated with the at least one first permitted OBSS threshold value to at least one STA upon determining that the at least one first permitted OBSS threshold value meets the transmission criterion.

In some implementations, the SR element may be carried in a beacon, a probe response, an action frame, a beacon report request, or a beacon report response.

In some implementations, the SR element may include an SRG identifier field. As an example, an SRG identifier associated with the second AP may be included in the SRG identifier field when the at least one first permitted OBSS threshold value included in the SR information is associated with a plurality of different SRGs.

In some implementations, the SR information may be included in an SR permission element.

In some implementations, the SR information may be included an SR parameter set element.

In some implementations, the transmission criterion may be associated with one or more of an interference level or transmission power.

In some implementations, the apparatus may transmit a first message to the first AP, the first message indicating that the first AP intends to reuse the resources over the second AP.

In some implementations, the apparatus may transmit a first message to the second AP, the first message indicating at least one second OBSS threshold value for reuse of the resources over the first AP. The apparatus may then receive a second message from the second AP indicating an updated at least one first permitted OBSS threshold value.

In some implementations, the apparatus may transmit an SR information request to the second AP, wherein the SR element is received in response to the SR information request. Then, the apparatus may monitor for the SR element.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 2C is a diagram illustrating SR information fields in accordance with certain aspects of the disclosure.

Like reference numbers and designations in the various drawings indicate like elements.

DETAILED DESCRIPTION

Figure 1:
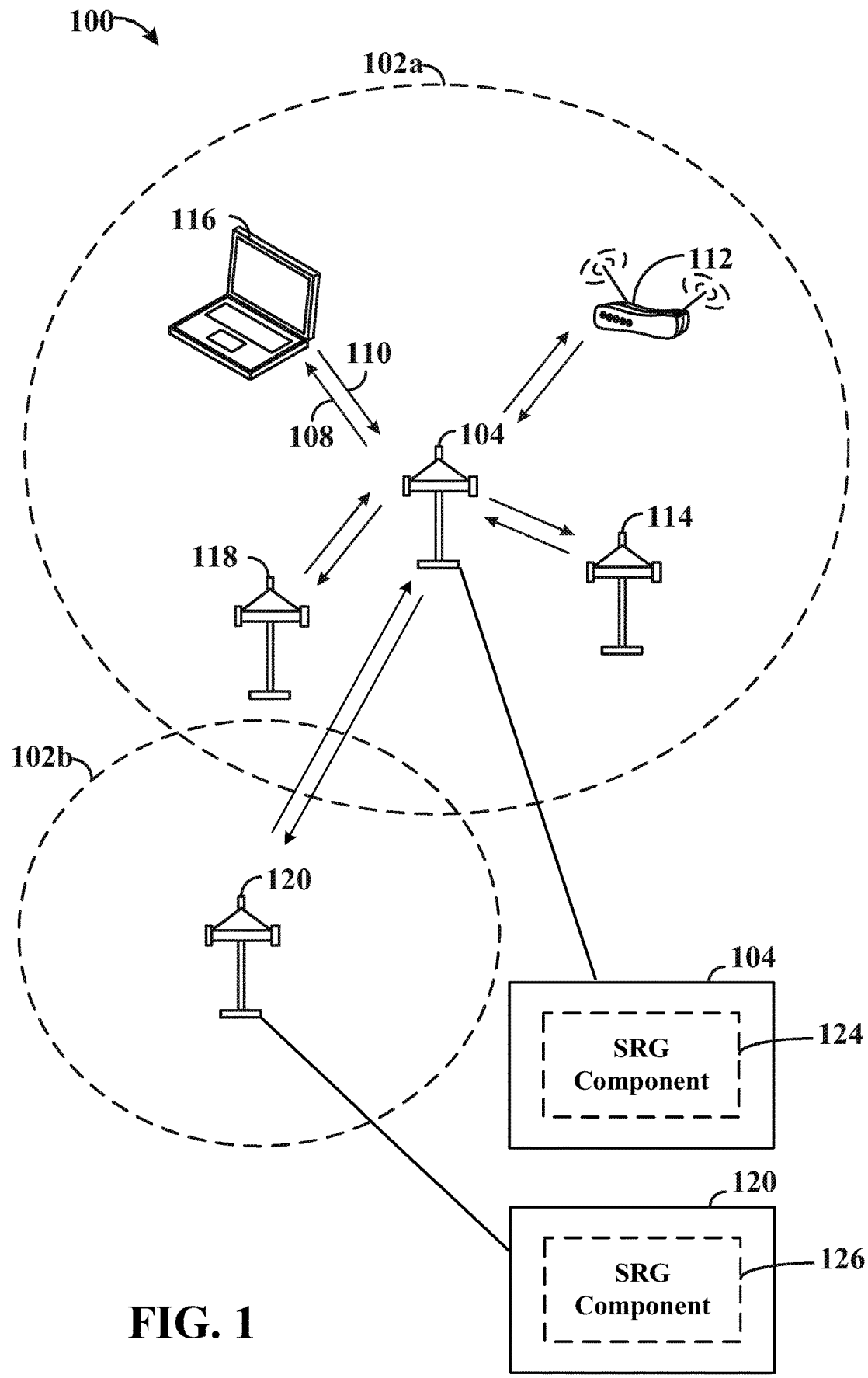
FIG. 1 shows an example wireless communication system in which aspects of the present disclosure may be employed.

Various aspects of the systems, apparatuses, computer-readable media, and methods are described more fully hereinafter with reference to the accompanying drawings. This disclosure may, however, be implemented in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the systems, apparatuses, computer program products, and methods disclosed herein, whether implemented independently of, or combined with, any other aspect of the disclosure. For example, an apparatus may be implemented, or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect disclosed herein may be implemented by one or more elements of a claim.

Although particular aspects are described herein, many variations and permutations of these aspects fall within the scope of the disclosure. Although some benefits and advantages of the aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the aspects. The detailed description and drawings are merely illustrative of the disclosure rather than limiting, the scope of the disclosure being defined by the appended claims and equivalents thereof.

A group of STAs that communicate with an AP may be known as a basic service set (BSS). In some cases, the area of one BSS may overlap with the area of another BSS, and the overlapping BSSs be known as an overlapping BSS (OBSS). A wireless device (such as a STA or an AP) may receive a configuration message from an AP that includes OBSS coordination parameters. The OBSS coordination parameters may then be used to select an OBSS preamble detection (PD) threshold or a transmission (TX) power. For example, an OBSS coordination parameter may include an indication of an OBSS PD threshold or the TX power or a range of OBSS PD thresholds or TX powers. In some cases, the coordination parameter may include selection criteria that may be used to select the indicated OBSS PD threshold or TX power. Additionally, or alternatively, a range selection criteria also may be used to select from a range of OBSS PD thresholds and TX powers. The wireless device may use the selected OBSS PD threshold or TX power to communicate with an AP or another device in the OBSS. Hence, the use or reuse of a particular wireless communication medium may be guided by another device, such as the AP. Spatial reuse refers to concurrent transmissions by different devices on the wireless communication medium. Spatial reuse may be used for inter-BSS transmission or intra-BSS transmissions in a Spatial Reuse Group (SRG). However, there may not be a mechanism by which a neighboring AP can reuse the same resources of a wireless communication medium that are used by an existing SRG. As used herein, reference to "reuse over" may refer to concurrent transmissions over a wireless communication medium. Such concurrent transmission by the neighboring AP may be referred to as reuse over the existing SRG.

The present disclosure provides a solution by enabling a first AP to advertise the OBSS PD thresholds of the SRG, and the second AP may join the SRG when the advertised OBSS PD thresholds meet a transmission criterion of the OBSS of the second AP.

Popular wireless network technologies may include various types of WLANs. A WLAN may be used to interconnect nearby devices together, employing widely used networking protocols. The various aspects described herein may apply to any communication standard, such as a wireless protocol, or a wired protocol.

In some aspects, wireless signals may be transmitted according to a WLAN protocol (such as IEEE 802.11) using OFDM, direct-sequence spread spectrum (DSSS) communications, a combination of OFDM and DSSS communications, or other schemes. In one aspect, the physical (PHY) layer may use the DSSS to achieve a data rate (such as PHY rate) of, for example, 11 Mbps. Implementations of the 802.11 protocol may be used for sensors, metering, and smart grid networks. Advantageously, aspects of certain devices implementing the 802.11 protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: APs and clients (also referred to as stations or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a Wi-Fi (such as the IEEE 802.11 protocol) compliant wireless link to obtain general connectivity to the Internet or to other wide area networks. In some implementations a STA also may be used as an AP.

A station also may include, be implemented as, or known as an access terminal (AT), a subscriber station, a subscriber unit, a mobile station, a remote station, a remote terminal, a user terminal, a user agent, a user device, a user equipment, or some other terminology. In some implementations, a station may include a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (such as a cellular phone or smartphone), a computer (such as a laptop), a portable communication device, a headset, a portable computing device (such as a personal data assistant), an entertainment device (such as a music or video device, or a satellite radio), a gaming device or system, a global positioning system device, or any other suitable device that is configured to communicate via a wireless medium.

The term "associate," or "association," or any variant thereof should be given the broadest meaning possible within the context of the present disclosure. By way of example, when a first apparatus associates with a second apparatus, it should be understood that the two apparatuses may be directly associated, or intermediate apparatuses may be present. For purposes of brevity, the process for establishing an association between two apparatuses will be described using a handshake protocol that requires an "association request" by one of the apparatus followed by an "association response" by the other apparatus. It will be understood by those skilled in the art that the handshake protocol may require other signaling, such as by way of example, signaling to provide authentication.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element. In addition, a phrase referring to "at least one of" a list of items refers to any combination of those items, including single members. As an example, "at least one of: A, B, or C" is intended to cover: A, or B, or C, or any combination thereof (such as A-B, A-C, B-C, and A-B-C).

As discussed above, certain devices described herein may implement an IEEE 802.11 standard, such as one or more of 802.11a, 802.11b, 802.11g, 802.11n, 802.11ac, 802.11ad, 802.11ah, 802.11ax, 802.11ay, 802.11az and 802.11-EHT. Such devices, whether used as a STA or AP or other device, may be used for smart metering or in a smart grid network. Such devices may provide sensor applications or be used in home automation. The devices may instead or in addition be used in a healthcare context, for example for personal healthcare. The devices also may be used for surveillance, to enable extended-range Internet connectivity (such as for use with hotspots), or to implement machine-to-machine communications.

FIG. 1 shows an example wireless communication system 100 in which aspects of the present disclosure may be employed. The wireless communication system 100 may operate pursuant to a wireless standard, for example the 802.11 standard. The wireless communication system 100 may include an AP 104 in communication with a plurality of mobile stations (STAs) 112, 114.

A variety of processes and methods may be used for transmissions in the wireless communication system 100 between the AP 104 and the STAs. For example, signals may be sent and received between the AP 104 and the STAs in accordance with OFDM/orthogonal frequency-division multiple access (OFDMA) techniques. When OFDMA techniques are used for communication, the wireless communication system 100 may be referred to as an OFDM/OFDMA system. Alternatively, signals may be sent and received between the AP 104 and the STAs in accordance with CDMA techniques. If this is the case, the wireless communication system 100 may be referred to as a CDMA system.

A communication link that facilitates transmission from the AP 104 to one or more of the STAs may be referred to as a DL 108, and a communication link that facilitates transmission from one or more of the STAs to the AP 104 may be referred to as a UL 110. Alternatively, a downlink 108 may be referred to as a forward link or a forward channel, and an uplink 110 may be referred to as a reverse link or a reverse channel. In some aspects, DL communications may include unicast or multicast traffic indications.

The AP 104 may suppress adjacent channel interference (ACI) in some aspects so that the AP 104 may receive UL communications on more than one channel simultaneously without causing significant analog-to-digital conversion (ADC) clipping noise. The AP 104 may improve suppression of ACI, for example, by having separate finite impulse response (FIR) filters for each channel or having a longer ADC backoff period with increased bit widths.

The AP 104 may act as a base station and provide wireless communication coverage in a basic service area (BSA) 102*a*. A BSA (such as the BSA 102*a*) is the coverage area of an AP (such as the AP 104). The APs 104, 114, 118 along with the STAs associated with the AP 104 and that use the AP 104 for communication may be referred to as a BSS. Similarly, the AP 120 may act as a base station and provide wireless communication coverage in a BSA 102*b*. The AP 120 along with the STAs (not shown in FIG. 1) associated with AP 120 and that use the AP 120 for communication also may be referred to as a BSS. In some scenarios, the area of one BSS (such as BSA 102*a*) may overlap with the area of another BSS (such as BSA 102*b*), and be referred to as OBSSs. An SRG may refer to a set of APs and/or BSSs (such as APs 104, 114, 118, 120) that are grouped together such that all of the wireless devices in the SRG share the same OBSS PD thresholds that are used by the wireless devices for reuse of the wireless communication medium by supporting concurrent inter-BSS transmissions and/or concurrent intra-BSS transmissions that meet the OBSS PD thresholds. In FIG. 1, the BSS area associated with AP 104 (such as BSA 102*a*) and the BSS area associated with AP 120 (such as BSA 102*b*) may form an SRG.

In some implementations, the wireless communication system 100 may not have a central AP (such as AP 104), but rather may function as a peer-to-peer network between the STAs. Accordingly, the functions of the AP 104 described herein may alternatively be performed by one or more of the STAs.

The AP 104 may transmit on one or more channels (such as multiple narrowband channels, each channel including a frequency bandwidth) a beacon signal (or simply a "beacon"), via a communication link such as the downlink 108, to other nodes (STAs) of the wireless communication system 100, which may help the other nodes (STAs) to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information that is both common (such as shared) amongst several devices and specific to a given device.

In some aspects, a STA (such as STAs 112 and 116) may be required to associate with the AP 104 in order to send communications to and/or to receive communications from the AP 104. In one aspect, information for associating may be included in a beacon broadcast by the AP 104. To receive such a beacon, the STA 116 may, for example, perform a broad coverage search over a coverage region. A search also may be performed by the STA 116 by sweeping a coverage region in a lighthouse fashion, for example. After receiving the information for associating, the STA 116 may transmit a reference signal, such as an association probe or request, to the AP 104. In some aspects, the AP 104 may use backhaul services, for example, to communicate with a larger network, such as the Internet or a public switched telephone network (PSTN).

In some implementations, the AP 104 may include one or more components for performing various functions. For example, the AP 104 may include an SRG component 124 configured to perform procedures that enable a neighboring AP (such as AP 120) to join an SRG. In this example, the SRG component 124 may be configured to generate an SR element that includes SR information. In some implementations, the SR information indicating that a first group of STAs associated with a second AP may reuse the wireless communication medium that is used for packets transmitted by a second group of STAs associated with the first AP. In some implementations, the SR information may include at least one first permitted OBSS threshold value for reuse over the first AP. In some other implementations, the SR element may be carried in a beacon, a probe response, or an action frame. In some other implementations, the SR element may further include an SRG identifier field. In some implementations, an SRG identifier associated with the first AP may be included in the SRG identifier field when the at least one first permitted OBSS threshold value included in the SR information is associated with a plurality of different SRGs. In some other implementations, the SR information may be included in an SR permission element. In some other implementations, the SR information may be included in an SR parameter set element. In some implementations, the SRG component 124 may be configured to transmit the SR element that includes the SR information. In some other implementations, the SRG component 124 may be configured to receive a first message from a second AP. In some implementations, the first message may indicate that the second AP intends to join an SRG associated with the first AP. In some other implementations, the SRG component 124 may be configured to include the second AP in the SRG. In some other implementations, the SRG component 124 may be configured to receive a first message from a second AP. In some aspects, the first message may indicate at least one second OBSS threshold value associated with the second AP. In some other implementations, the SRG component 124 may be configured to update the at least one first OBSS threshold value to match the at least one second OBSS threshold value. In some other implementations, the SRG component 124 may be configured to transmit a second message to the second AP indicating the updated at least one first OBSS threshold value. In some other implementations, the SRG component 124 may be configured to receive an SR information request from the second AP. In some implementations, the SR element may be generated in response to the SR information request.

In some implementations, the AP 120 may include one or more components for performing various functions. For example, the AP 120 may include an SRG component 126 configured to perform procedures related to joining an SRG associated with a neighboring AP (such as AP 104). In this example, the SRG component 126 may be configured to receive, from a second AP, an SR element that includes SR information. In some implementations, the SR information including at least one permitted OBSS threshold value for reuse of the wireless communication medium used by the second AP. In some other implementations, the SR element may be carried in a beacon, a probe response, or an action frame. In some other implementations, the SR element may further include an SRG identifier field. In some other implementations, an SRG identifier associated with the second AP may be included in the SRG identifier field when the at least one first permitted OBSS threshold value included in the SR information is associated with a plurality of different SRGs. In some other implementations, the SR information may be included in an SR permission element. In some other implementations, the SR information may be included an SR parameter set element. In some implementations, the SRG component 126 may be configured to determine if the at least one first permitted OBSS threshold value meets a transmission criterion. In some implementations, the transmission criterion may be associated with one or more of an interference level or transmission power. In some other implementations, the SRG component 126 may be configured to transmit a first message to the second AP. In some implementations, the first message may indicate that the first AP intends to join a SRG associated with the second AP. In some other implementations, the SRG component 126 may be configured to transmit information associated with the at least one first permitted OBSS threshold value to at least one STA upon determining that the at least one first permitted OBSS threshold value meets the transmission criterion. In some other implementations, the SRG component 126 may be configured to transmit a first message to the second AP. In some implementations, the first message may indicate at least one second OBSS threshold value associated with reuse over the second AP. In some other implementations, the SRG component 126 may be configured to receive a second message to the second AP indicating the updated at least one first OBSS threshold value. In some other implementations, the SRG component 126 may be configured to transmit an SR information request to the second AP. In some implementations, the SR element may be received in response to the SR information request. In some other implementations, the SRG component 126 may be configured to monitor for the SR element.

In a Wi-Fi network, wireless devices such as APs and STAs may perform a clear channel assessment (CCA) to determine whether a transmission channel is busy or idle for purposes of determining whether data may be transmitted to another wireless device. A CCA has two components: carrier sense (CS) and energy detection. Carrier sense refers to an ability of a wireless device (such as AP or STA) to detect and decode incoming Wi-Fi signal preambles, signals which enable the receiver to acquire a wireless signal from and synchronize with the transmitter, from other wireless devices. For example, a first AP may broadcast a Wi-Fi signal preamble, and the Wi-Fi signal preamble may be detected by a second AP or a STA. Similarly, a third AP may broadcast a Wi-Fi signal preamble, and the Wi-Fi signal preamble may be detected by the second AP. When the second AP detects one or more of the Wi-Fi signal preambles, the second AP may determine that the transmission channel is busy and not transmit data. The CCA may remain busy for the length of a transmission frame associated with the Wi-Fi signal preambles.

The second component of CCA is energy detection, which refers to the ability of a wireless device to detect an energy level present on a transmission channel. The energy level may be based on any of different interference sources, Wi-Fi transmissions, a noise floor, or ambient energy. Wi-Fi transmissions may include unidentifiable Wi-Fi transmissions that have been corrupted or are so weak that the transmission can no longer be decoded. Unlike carrier sense, in which the exact length of time for which a transmission channel is busy may be known, energy detection uses periodic sampling of a transmission channel to determine if the energy still exists. Additionally, energy detection may require at least one threshold used to determine whether the reported energy level is adequate to report the transmission channel as busy or idle. This energy level may be referred to as the ED level/ED threshold level or the CCA sensitivity level. For example, if an ED level is above a threshold, a wireless device may defer to other devices by refraining from transmitting.

A group of STAs that communicate with an AP may be known as a BSS. In some cases, the area of one BSS may overlap with the area of another BSS, and the overlapping BSSs be known as an OBSS. A wireless device (such as a STA or an AP) may receive a configuration indication from an AP that includes OBSS coordination parameters. The OBSS coordination parameters may then be used to select an OBSS PD threshold or a TX power. For example, an OBSS coordination parameter may include an indication of an OBSS PD threshold or the TX power or a range of OBSS PD thresholds or TX powers. In some cases, the OBSS coordination parameter may include selection criteria that may be used to select the indicated OBSS PD threshold or TX power. Additionally, or alternatively, a range selection criteria also may be used to select from a range of OBSS PD thresholds and TX powers. The wireless device may use the selected OBSS PD threshold or TX power to communicate with an AP or another device in the OBSS. Hence, the use or reuse of a particular wireless communication medium may be guided by another device, such as the AP. Spatial reuse refers to concurrent transmissions by different devices on the wireless communication medium. When an AP uses the same resources of a wireless communication medium that are used by an existing SRG, the AP may be described as reusing over the existing SRG. Thus, "reuse over" may refer to the AP transmitting a transmission concurrently over a wireless communication medium that is used for packet transmission by an SRG.

A first implementation for spatial reuse may include spatial reuse parameter (SRP) based spatial reuse. SRP based spatial reuse may be performed on a per-link basis to ensure that a packet transmitted with a reuse of the wireless communication medium will meet a target signal-to-interference-plus-noise ratio (SINR) threshold.

A second implementation for spatial reuse may include OBSS PD based spatial reuse. Using OBSS PD based spatial reuse, an AP may advertise a range of PD thresholds that may be used by an associated wireless device to determine if reuse of the wireless communication medium over an OBSS packet (such as transmitted by a different wireless device in the OBSS) may be performed. The OBSS PD based spatial reuse implementation may include a non-SRG mode or an SRG mode.

In non-SRG mode, spatial reuse may be applicable to any physical layer convergence procedure (PLCP) protocol data unit (PPDU) that is classified as inter-BSS (such as PPDU sent within the associated BSS) but not as intra-BSS (such as PPDU sent in a different BSS). When an associated AP does not communicate an OBSS coordination parameter (such as via a spatial reuse element), also referred to as spatial reuse information, that includes a minimum OBSS PD threshold (such as OBSS PD_Min) or a maximum OBSS PD threshold (such as OBSS PD_Max), a wireless device operating in non-SRG mode may use preconfigured values for OBSS PD_Min (such as −82 dBm) and OBSS PD_Max (such as −62 dBm). When the AP communicates spatial reuse information (such as via a spatial reuse element), the AP may set the OBSS PD_Min using a preconfigured value (such as −82 dBm), and the AP may select OBSS PD_Max between from a preconfigured range (such as −82 dBm to −62 dBm). In non-SRG mode, the spatial reuse information may be associated with preconfigured clear channel assessment (CCA) thresholds rather than optimized for the system.

SRG mode may be beneficial in a wireless network with a planned topology (such as a topology with a preconfigured location for each AP, BSS, or OBSS—such as in an apartment or office) in which OBSSs are densely located. Spatial reuse in SRG mode may be applicable to any PPDU that is classified as either inter-BSS or intra-BSS. In SRG mode, an AP may select the OBSS PD_Min threshold and OBSS PD_Max threshold for a group of BSSs (such as an SRG), such as based on system overhead, interference levels, etc. In other words, the PD thresholds in SRG mode may be selected to optimize reuse in a wireless network with a preconfigured topology. In SRG mode, an AP may send spatial reuse information (such as via a spatial reuse element or via a spatial reuse parameter set element) to associated STAs or other APs in the SRG. The spatial reuse information may indicate, such as the OBSS PD_Min, OBSS PD_Max, an SRG BSS color bitmap, or an SRG partial BSS identification (BSSID) bitmap. The SRG BSS color bitmap or SRG partial BSSID bitmap may be used to define the SRG.

However, when the wireless network has a preconfigured topology, there may be no mechanism by which a new AP (such as an AP that is not part of the preconfigured topology of the SRG) can reuse over an AP in the existing SRG. Consequently, a neighboring AP may cause certain problems to an existing SRG. For example, an OBSS that includes the neighboring AP may benefit by configuring the OBSS PD_Min value such that STAs in the OBSS aggressively reuse over the SRG. When STAs aggressively reuse over the SRG, the quality of service (QoS) experienced by users in the SRG may be reduced. Thus, there is a need for a mechanism by which a neighboring AP may join the SRG.

The present disclosure provides a solution by enabling a first AP in an SRG to advertise the OBSS PD thresholds of the SRG, and the second AP may join the SRG when the advertised OBSS PD thresholds meet a transmission criterion of the neighboring OBSS, such as described below in connection with any of FIGS. 2-8.

Figure 2A:
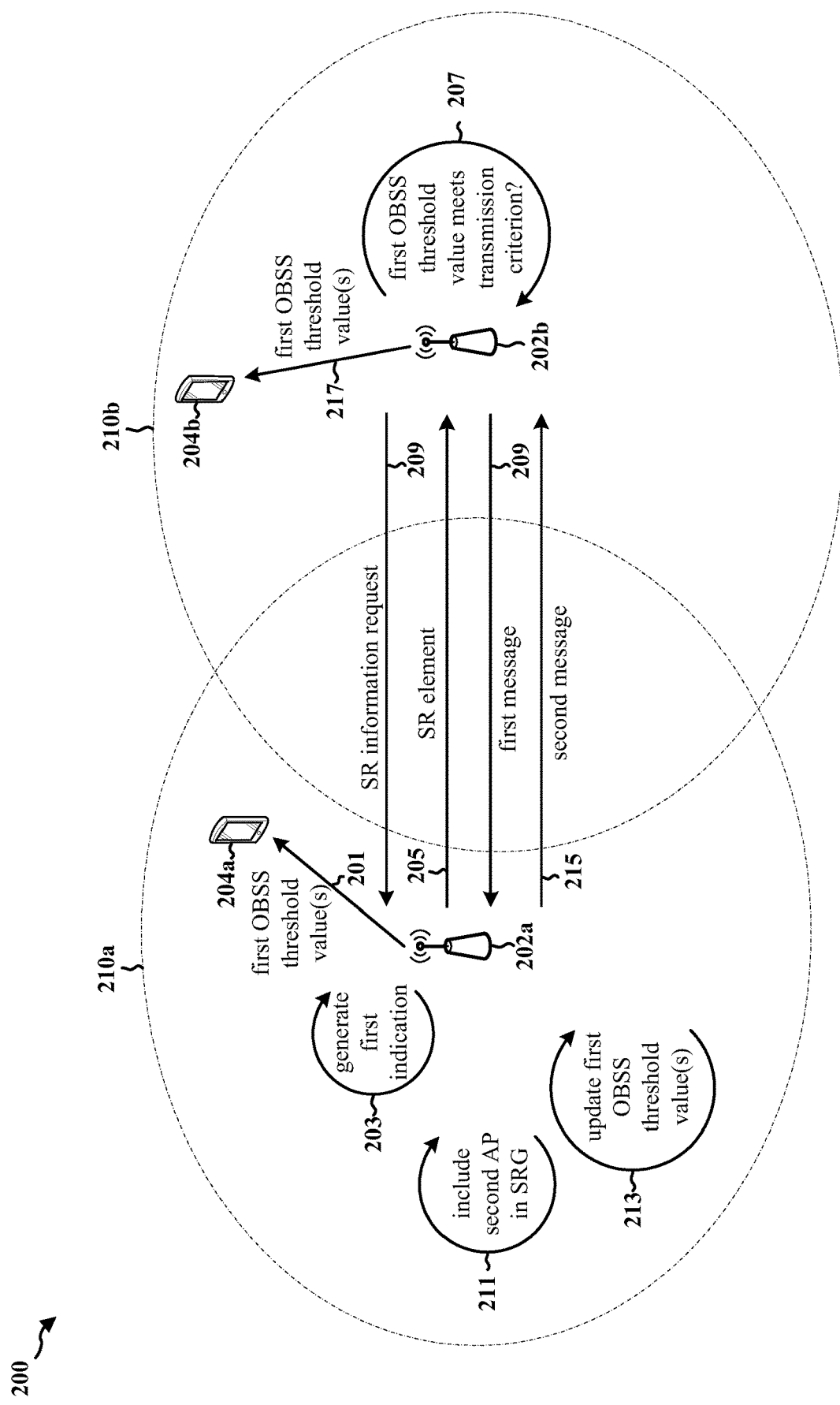
FIG. 2A is a diagram illustrating a mechanism for reusing over an AP in accordance with certain aspects of the disclosure.

FIG. 2A is a diagram 200 illustrating a mechanism by which a second OBSS 210b may reuse over a first OBSS 210a in accordance with certain aspects of the disclosure.

In the example illustrated in FIG. 2A, the first OBSS 210a may include a first AP 202a and one or more associated STAs (not shown), and the second OBSS 210b may include a second AP 202b and one or more associated STAs 204b.

Although the techniques described below are for two OBSSs, the technique may be performed by more than two OBSSs without departing from the scope of the present disclosure.

Spatial reuse (such as spatial reuse in SRG mode) may be supported by the first OBSS 210a and the second OBSS 210b. For example, concurrent inter-BSS transmissions or concurrent intra-BSS transmissions over the wireless communication medium may be supported in the SRG such that the STAs or APs in the first OBSS 210a and the second OBSS 210b may transmit over one another when certain OBSS threshold criteria are met.

In the example illustrated in FIG. 2A, the first AP 202a may select the OBSS PD_Min threshold and OBSS PD_Max threshold for reuse over the first AP 202a, such as based on system overhead, interference levels, preconfigured thresholds, etc. In other words, the first AP 202a may send (at 201) spatial reuse information (such as via a spatial reuse element or via a spatial reuse parameter set element) to associated STAs 204a (such as a second group of STAs) in the first OBSS 210a so that the associated STAs 204a may perform inter-BSS spatial reuse over the first AP 202a. The SR information may indicate, such as the OBSS PD_Min, OBSS PD_Max, an SRG BSS color bitmap (such as the color bitmap may indicate that the first OBSS 210a and any other OBSS(s) that are assigned the same color, and hence, are members of the same SRG), or an SRG partial BSSID bitmap.

In addition to sending the spatial reuse information to other wireless devices in the first OBSS 210a, the first AP 202a also may broadcast or transmit the SR information so that any neighboring OBSSs may reuse over the first AP 202a. For example, the first AP 202a may generate (at 203) an SR element that includes SR information associated with reuse over the first AP 202a. In some implementations, the SR information may include at least one first permitted OBSS threshold value for reuse over the first AP 202a. For example, the at least one first permitted OBSS threshold value may include the OBSS PD_Min threshold or the OBSS PD_Max threshold used for spatial reuse by the wireless devices in the second OBSS 210b. In some implementations, the SR information may be included in an SR permission element in the SR element. In some other implementations, the SR information may be included in an SR parameter set element in the SR element.

Figure 2B:
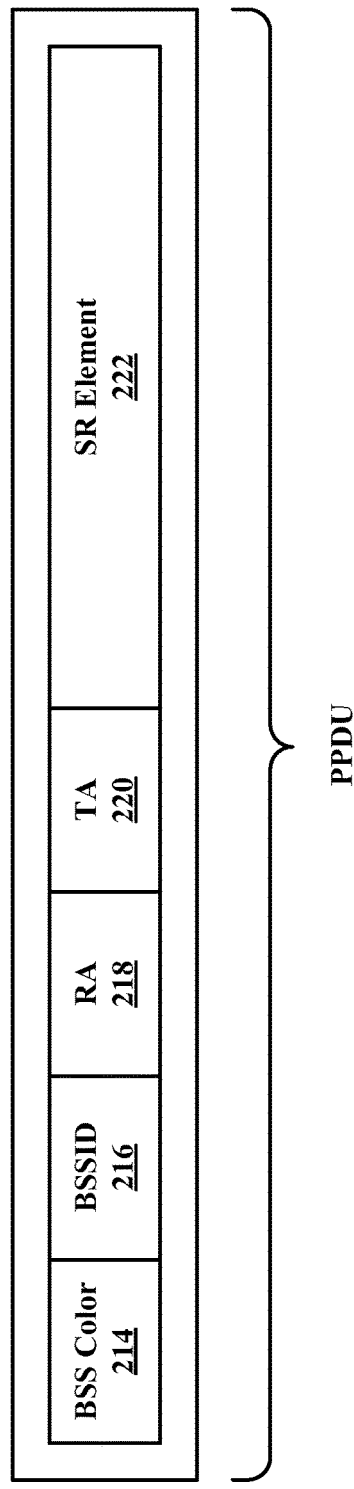
FIG. 2B is a diagram illustrating a PPDU that may carry an SR element in accordance with certain aspects of the disclosure.

In some implementations, the SR element generated (at 203) by the first AP 202a may be carried in a beacon frame, a probe response frame, an action frame (such as described in the 802.11k protocol), a beacon report request (such as described in the 802.11k protocol), or a beacon report response (such as described in the 802.11k protocol). An example PPDU that may include either a beacon frame, a probe response frame, or an action frame is illustrated in FIG. 2B. An SR element carried in the PPDU (such as beacon frame, probe response frame, or action frame) is illustrated in FIG. 2C.

In some implementations, the SR element generated (at 203) may be carried in a beacon frame when the first AP 202a is configured to periodically announce its presence and to relay information such as the SR information to other wireless devices. In some other implementations, the SR element generated (at 203) may be carried in a probe response frame when an SR information request 221 (such as probe request frame) that requests SR information is received from the second AP 202b. In some implementations, the SR information request 221 may indicate a willingness to join an SRG associated with the first OBSS 210a/first AP 202a. In some other implementations, the SR element generated (at 203) may be carried in an action frame when the first AP 202a wants to instruct any new neighboring APs (such as the second AP 202b) that the reuse over the wireless devices in the first OBSS 210a is available.

In some implementations, the SR element generated (at 203) by the first AP 202a may include an identifier field, and an SRG identifier associated with at least the SRG of the first AP 202a may be included in the identifier field. In scenarios in which the SR information is associated with a plurality of different SRGs (not illustrated in FIG. 2A), a specific value (such as 0x00) may be included in the SRG identifier field of the SR element. Alternatively, when the SR information is associated with a plurality of different SRGs (not illustrated in FIG. 2A) the identifier field may be omitted.

The first AP 202a may transmit (at 205) the SR element that includes the SR information to the second AP 202b. The SR information transmitted (at 205) may indicate, such as the OBSS PD_Min, OBSS PD_Max, an SRG BSS color bitmap (such as the color bitmap may indicate that the first OBSS 210a and any other OBSS(s) that are assigned the same color, and hence, are members of the same SRG), or an SRG partial BSSID bitmap. In some implementations, the second AP 202b may determine (at 207) if the at least one first permitted OBSS threshold value meets a transmission criterion. The transmission criterion may be associated with a tolerated interference level, a range of transmission powers, or system overhead associated with the second OBSS 210b. For example, the second AP 202b may determine (at 207) if the at least one first permitted OBSS threshold value meets a transmission criterion by comparing the OBSS threshold value with the transmission criterion. When the OBSS threshold value is within the tolerated interference level or range of transmission powers for wireless devices within the second OBSS 210b, the second AP 202b may determine (at 207) to reuse over the first AP 202a or to join a the SRG associated with the first AP 202a. Because the threshold criterion of the second AP 202b complies with the OBSS threshold value(s) of the first AP 202a, it follows that the OBSS threshold value(s) of the second AP 202b also may comply with the threshold criterion of the first AP 202a.

Otherwise, when the OBSS threshold value is outside the tolerated interference level or range of transmission powers for the second OBSS 210b, the second AP 202b may determine (at 207) not to reuse over the first AP 202a or to join the SRG associated with the first AP 202a.

In some implementations, the second AP 202b may transmit (at 209) a first message (such as a PPDU, an SR element, SR information, etc.) indicating that the second AP 202b will comply with the at least one first OBSS threshold value and that wireless devices in the second OBSS 210b may reuse over the first AP 202a. When the first message is received by the first AP 202a, the first AP 202a may include (at 211) the second AP 202b in the SRG. The first AP 202a may include (at 211) the second AP 202b in the SRG by updating a color bitmap to assign the second OBSS 210b the same color as the first OBSS 210a.

Additionally, or alternatively, the first message (transmitted at 209) may include information associated with at least one second OBSS threshold value associated with reuse over the second AP 202b. The first AP 202a may determine (at 213) whether to update the at least one first OBSS threshold value based on the at least one second OBSS threshold value associated with reuse over the second AP 202b. For example, when the at least one second OBSS threshold value is more conservative (such as includes a narrower OBSS threshold value range) than the at least one first OBSS threshold value, the first AP 202a may determine (at 213) to update the at least one first OBSS threshold value to match the at least one second OBSS threshold value. The first AP 202a may transmit (at 215) a second message (such as a PPDU, an SR element, SR information, etc.) that indicates the updated at least one first OBSS threshold value to the second AP 202b.

Otherwise, when the second determines (at 207) not to reuse over the first AP 202a or join the SRG associated with the first AP 202a, the second AP 202b may not transmit an indication to the first AP 202a, or the second AP 202b may transmit an indication not to reuse over the first AP 202a or to join the SRG of the first AP 202a.

The second AP 202b may transmit (at 217) the SR information associated with the at least one first permitted OBSS threshold value to at least one STA 204b (such as to all STAs or a group of STAs associated with the second OBSS 210b) upon determining (at 207) that the at least one first permitted OBSS threshold value meets the transmission criterion. Additionally, or alternatively, the second AP 202b may the updated at least one first permitted OBSS threshold value or the at least one second OBSS threshold value for reuse over the second AP 202b to the at least one STA 204b. The second AP 202b or the associated STAs 204b may use the SR information to reuse the wireless communication medium (such as to send concurrent inter-BSS transmissions or concurrent intra-BSS transmissions) over the first AP 202a or second AP 202b.

Using the techniques described above in FIG. 2A, a mechanism is provided that enables a neighboring AP (such as second AP 202b) to reuse over or join an existing SRG. The mechanism described above may provide an enforceable rule since the permission to join the SRG may be explicitly indicated through the beacon frame or probe response frame, and hence, the inclusion of a neighboring AP as a member of the SRG may be enforced. Using the above technique, an SRG may be described as "loosely" managed APs in that SRG based reuse may be applicable in cases where there is no central controller.

FIG. 2B is a diagram illustrating an example PPDU 235 that may include an action frame, a probe response frame, or a beacon frame in accordance with certain aspects of the disclosure.

The PPDU 235 may include one or more of a BSS color 214, a BSSID 216, a receiver address (RA) 218, a transmitter address (TA) 220, or SR element 222 (for example that includes SR information). In some implementations, the PPDU 235 may be a high efficiency (HE) PPDU that is generated to comply with the IEEE 802.11ax or 802.11k communication standard(s).

The BSS color 214 field may be an identifier of an OBSS (such as the first OBSS 210a, the second OBSS 210b, etc.). The BSS color 214 field may be used to assist in identifying the OBSS from which the PPDU 235 originates. In some implementations, the BSS color 214 field may include a value between, for example one and 63. In some other implementations, the BSS color 214 field may include six bits. In some other implementations, the BSS color 214 field may be a field in an HE signal (HE SIG) field in a HE preamble (not illustrated) of the PPDU 235.

The BSSID 216 field may include a BSSID. In some implementations, the BSSID 216 may include the MAC addresses of the APs in an SRG, and the BSSID 216 may be generated by, for example, combining a 24-bit Organization Unique Identifier (the manufacturer's identity) and the manufacturer's assigned 24-bit identifier for the radio chipset in the APs. In some implementations, the BSSID 216 may be a 48-bit MAC address in accordance with IEEE 802.11 (such as 802.11ax, 802.11k, etc.).

The RA 218 may be an address that indicates the receiver (such as the first AP 202a, the second AP 202b, etc.) of the PPDU 235. The TA 220 may be an address that indicates the transmitter (such as the first AP 202a, the second AP 202b, etc.) of the PPDU 235.

In some implementations, the SR element 222 may be an information element (ID) that is carried by the PPDU 235. In some implementations, the SR element 222 may be an SR permission element. In some other implementations, the SR element 222 may be an SR parameter set element. The SR element 222 may include one or more of the SR information fields described below in connection with FIG. 2C.

FIG. 2C is a diagram illustrating an example of the SR information fields 245 in an SR element 222 in accordance with certain aspects of the disclosure. The SR information fields 245 may include any of OBSS TX max 224, OBSS PD min 226, OBSS PD max 228, SRG BSS color bitmap 230, SRG Partial BSSID bitmap 232, or an SRG identifier 234 field.

In some implementations, the SR element 222 may include an indication that one or more of the fields is not included. In some implementations, the SR element 222 may include an indication whether SR is allowed for a neighboring OBSS (such as second OBSS 210b). In some implementations, the SR element 222 may include an indication whether SR is allowed over the devices in an SRG (such as the first OBSS 210a). In some implementations, SR element 222 may be part of an SR parameter set element carried in a PPDU 235 (such as action frame, beacon frame, probe request frame, probe response frame, etc.). The OBSS TX max 224 may indicate a maximum TX (such as 30 dBm for the first OBSS 210a or the second OBSS 210b) for the receiver of the SR element 222 (such as the first AP 202a, the first set of STAs 204a, the second AP 202b, the second set of STAs 204b). The OBSS TX max 224 may be used to determine if SR can be used for inter-BSS (such as OBSS) PPDUs or intra-BSS PPDUs.

In some implementations, OBSS PD Min 226 may be an indication of a PD minimum for determining if SR can be used for inter-BSS PPDUs or intra-BSS PPDUs.

In some implementations, OBSS PD Max 228 may be an indication of a PD max for determining if SR can be used for inter-BSS PPDUs or intra-BSS PPDUs.

In some implementations, SRG BSS color bitmap 230 may indicate the color of the BSS from which the SR element 222 was transmitted, and hence, the SRG associated with the SR element 222

SRG partial BSSID bitmap 232 may include BSSID range, BSSID range of bits match, BSSID list, BSSID hashed index, SRG partial BSSID bitmap, SRG BSS BSSIDS, or SRG BSS BSSIDS.

In some implementations, the SRG identifier 234 field may include an SRG identifier (such as color, C1, C2, C3, C4, etc.) associated with at least the SRG associated with the transmitting SRG (such as the first AP 202a). In scenarios in which the SR information in the SR element 222 is associated with a plurality of different SRGs, a specific value (such as 0x00) may be included in the SRG identifier 234 field of the SR element. Alternatively, when the SR information is associated with a plurality of different SRGs the SRG identifier 234 field may be omitted.

Figure 3:
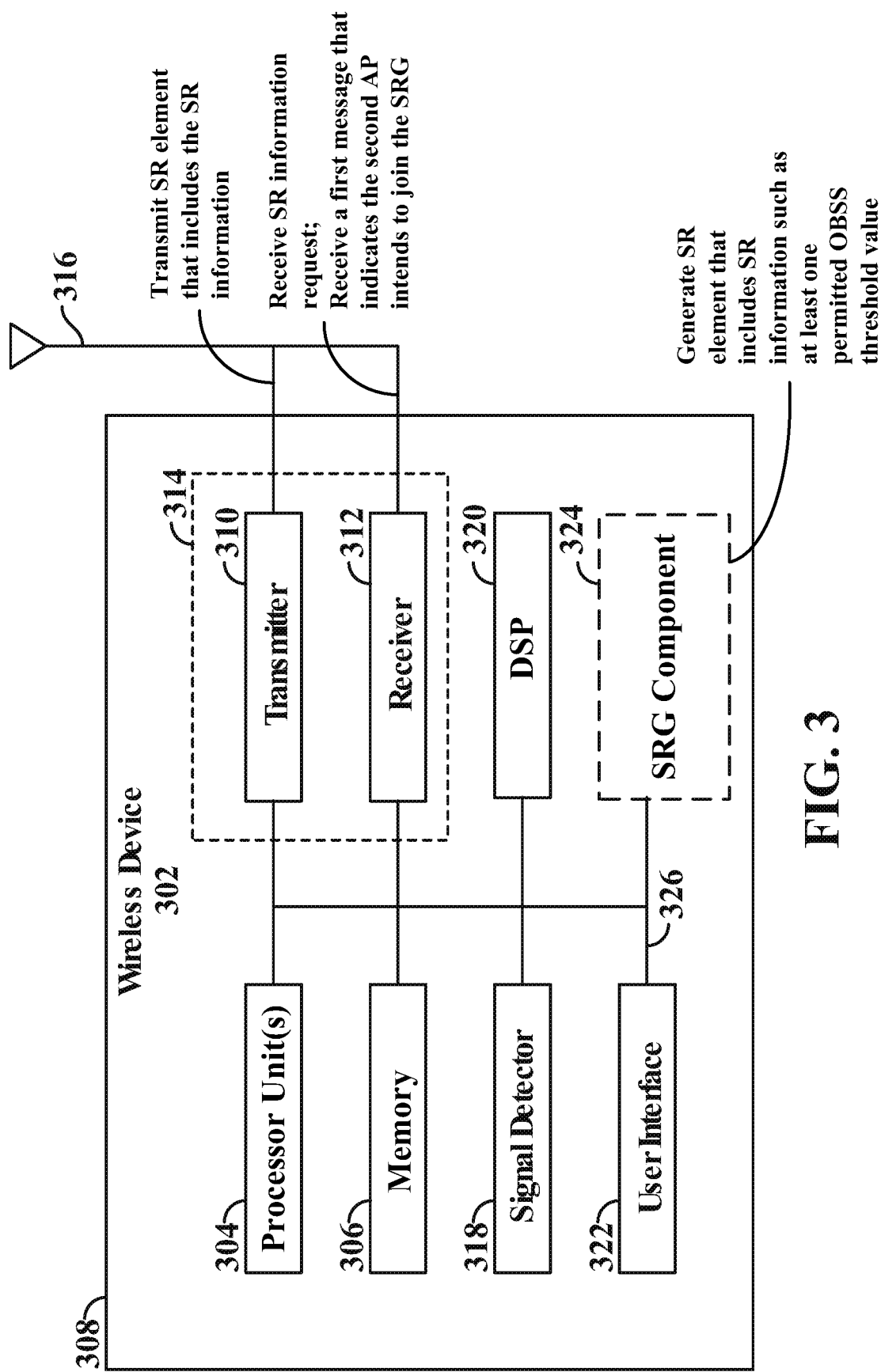
FIG. 3 shows an example functional block diagram of a wireless communication device that may support reuse over transmissions of the wireless communication device within the wireless communication system of FIG. 1.

FIG. 3 shows an example functional block diagram of a wireless communication device 302 that may be configured to enable reuse by another AP within the wireless communication system 100 of FIG. 1. The wireless communication device 302 is an example of a device that may be configured to implement the various methods described herein. For example, the wireless communication device 302 may correspond to, such as AP 104, first AP 202a, the wireless communication device 500.

The wireless communication device 302 may include a processor 304 which controls operation of the wireless communication device 302. The processor 304 also may be referred to as a central processing unit (CPU). Memory 306, which may include both read-only memory (ROM) and random-access memory (RAM), may provide instructions and data to the processor 304. A portion of the memory 306 also may include non-volatile random-access memory (NVRAM). The processor 304 may perform logical and arithmetic operations based on program instructions stored within the memory 306. The instructions in the memory 306 may be executable (by the processor 304, for example) to implement the methods described herein.

The processor 304 may include or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system also may include machine-readable media for storing software. Software shall be construed broadly to mean any type of instructions, whether referred to as software, firmware, middleware, microcode, hardware description language, or otherwise. Instructions may include code (such as in source code format, binary code format, executable code format, or any other suitable format of code). The instructions, when executed by the one or more processors, may cause the processing system to perform the various functions described herein.

The wireless communication device 302 also may include a housing 308, and the wireless communication device 302 may include a transmitter 310 or a receiver 312 to allow transmission and reception of data between the wireless communication device 302 (such as an AP) and a remote device (such as a STA). The transmitter 310 and the receiver 312 may be combined into a transceiver 314. An antenna 316 may be attached to the housing 308 and electrically coupled to the transceiver 314. The wireless communication device 302 also may include multiple transmitters, multiple receivers, multiple transceivers, or multiple antennas.

The wireless communication device 302 also may include a signal detector 318 that may be used to detect and quantify the level of signals received by the transceiver 314 or the receiver 312. The signal detector 318 may detect such signals as total energy, energy per subcarrier per symbol, power spectral density, and other signals. The wireless communication device 302 also may include a DSP 320 for use in processing signals. The DSP 320 may be configured to generate a packet for transmission. In some aspects, the packet may include a PPDU.

The wireless communication device 302 may further include a user interface 322 in some aspects. The user interface 322 may include a keypad, a microphone, a speaker, or a display. The user interface 322 may include any element or component that conveys information to a user of the wireless communication device 302 or receives input from the user.

When the wireless communication device 302 is implemented as an AP (such as the AP 104, first AP 202a, wireless communication device 500), the wireless communication device 302 also may include an SRG component 324. For example, the wireless communication device 302 may include an SRG component 324 configured to perform procedures related to enabling a neighboring AP (such as AP 120, the second AP 202b, the wireless communication device 602, 800) to join an SRG. In this example, the SRG component 324 may be configured to generate an SR element that includes SR information. In some implementations, the SR information indicating that a first group of STAs associated with a second AP may reuse over packets transmitted by a second group of STAs associated with the first AP. In some other implementations, the SR element may be carried in a beacon, a probe response, or an action frame. In some other implementations, the SR element may further include an SRG identifier field. In some other implementations, an SRG identifier associated with the first AP may be included in the SRG identifier field when the at least one first permitted OBSS threshold value included in the SR information is associated with a plurality of different SRGs. In some other implementations, the SR information may be included in an SR permission element. In some other implementations, the SR information may be included in an SR parameter set element. In some implementations, the SRG component 324 may be configured to transmit the SR element that includes the SR information. In some other implementations, the SRG component 324 may be configured to receive a first message from a second AP. In some implementations, the first message may indicate that the second AP intends to join an SRG associated with the first AP. In some other implementations, the SRG component 324 may be configured to include the second AP in the SRG. In some other implementations, the SRG component 324 may be configured to receive a first message from a second AP. In some implementations, the first message may indicate at least one second OBSS threshold value associated with the second AP. In some other implementations, the SRG component 324 may be configured to update the at least one first OBSS threshold value to match the at least one second OBSS threshold value. In some other implementations, the SRG component 324 may be configured to transmit a second message to the second AP indicating the updated at least one first OBSS threshold value. In some other implementations, the SRG component 324 may be configured to receive an SR information request from the second AP. In some implementations, the SR element may be generated in response to the SR information request.

The various components of the wireless communication device 302 may be coupled together by a bus system 326. The bus system 326 may include a data bus, for example, as well as a power bus, a control signal bus, and a status signal bus in addition to the data bus. Components of the wireless communication device 302 may be coupled together or accept or provide inputs to each other using some other mechanism.

Although a number of separate components are illustrated in FIG. 3, one or more of the components may be combined or commonly implemented. For example, the processor 304 may be used to implement the functionality described above with respect to the processor 304, but also to implement the functionality described above with respect to the signal detector 318, the DSP 320, the user interface 322, or the SRG component 324. Further, each of the components illustrated in FIG. 3 may be implemented using a plurality of separate elements.

Figure 4:
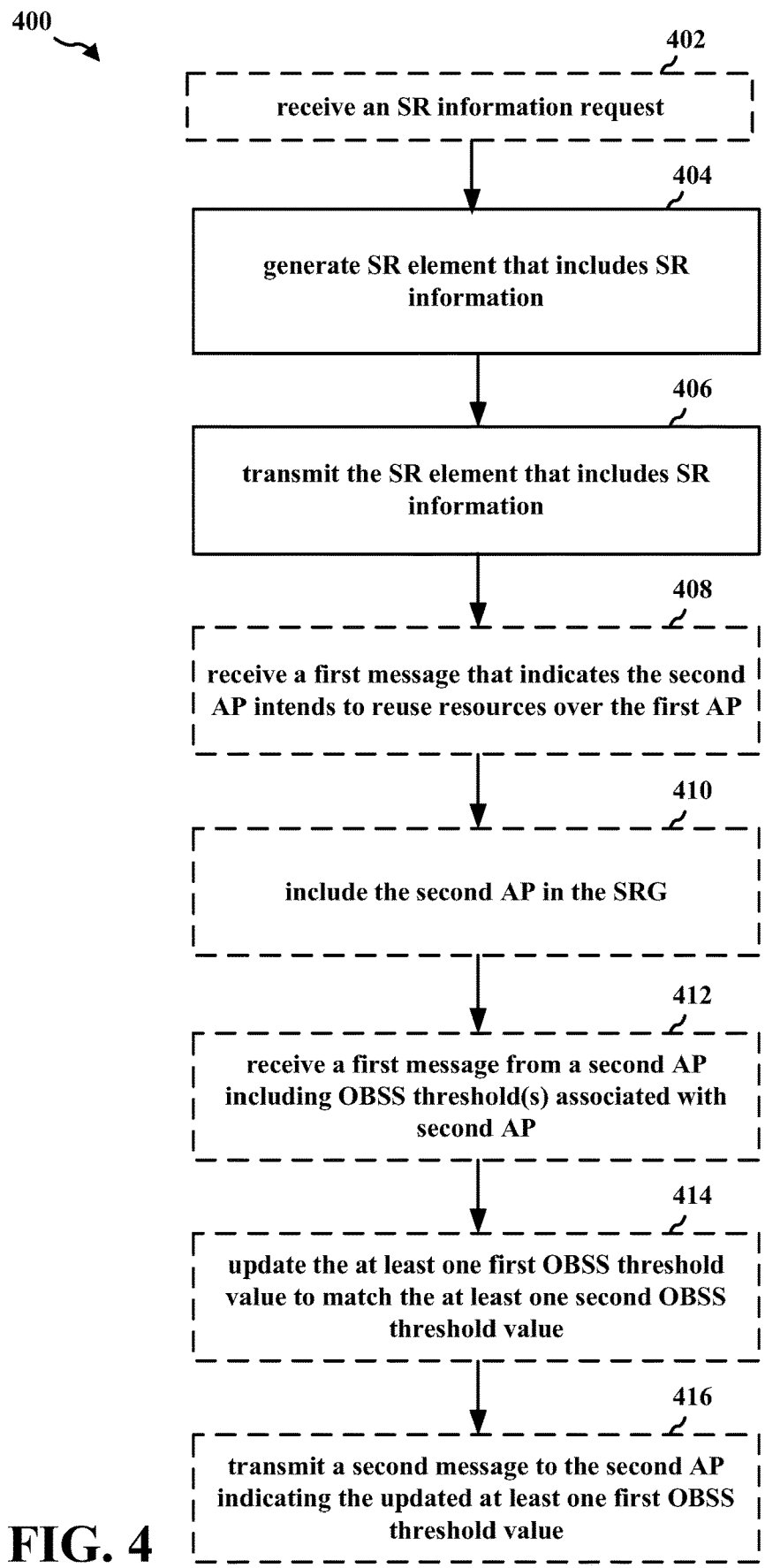
FIG. 4 is a flowchart of an example method for enabling reuse over transmissions of a first AP in accordance with certain aspects of the present disclosure.

FIG. 4 is a flowchart of an example method 400 to enable reuse by another AP in accordance with certain aspects of the disclosure. The method 400 may be performed using a first AP (such as the AP 104, 120, the first AP 202a, the second AP 202b, the wireless communication device 302, 500, 602, 800) in communication with a second AP (such as the AP 104, 120, the first AP 202a, the second AP 202b, the wireless communication device 302, 500, 602, 800). In FIG. 4, optional operations are indicated with dashed lines.

At 402, the first AP may receive an SR information request from the second AP. In some implementations, an SR element may be generated in response to the SR information request. For example, referring to FIG. 2, the SR element generated (at 203) may be carried in a probe response frame when an SR information request 221 (such as probe request frame) that requests SR information is received from the second AP 202b.

At 404, the first AP may generate an SR element that includes SR information. In some implementations, the SR information indicating that a first group of STAs associated with a second AP may reuse resources that are used for packets transmitted by a second group of STAs associated with the first AP. Such reuse of the resources may be described as reuse over the second group of STAs. In some other implementations, the SR element may be carried in a beacon, a probe response, or an action frame. In some other implementations, the SR element may further include an SRG identifier field. The SR information may indicate a partial BSSID bitmap, such as including any of a BSSID range, a BSSID range of bits match, a BSSID list, a BSSID hashed index, an SRG partial BSSID bitmap, SRG BSS BSSIDS, or a SRG BSS BSSIDS. In another example, the SR information may indicate color information associated with at least an SR group including the first AP, such as an SRG identifier (such as color, C1, C2, C3, C4, etc.) associated with at least the SRG associated with the first AP. In some other implementations, an SRG identifier associated with the first AP may be included in the SRG identifier field when the at least one first permitted OBSS threshold value included in the SR information is associated with a plurality of different SRGs. In some other implementations, the SR information may be included in an SR permission element. In some other implementations, the SR information may be included in an SR parameter set element. For example, referring to FIG. 2A, the first AP 202a may generate (at 203) an SR element that includes SR information associated with reuse the resources over the first AP 202a. In some implementations, the SR information may include at least one first permitted OBSS threshold value for reuse of the resources over the first AP 202a. For example, the at least one first permitted OBSS threshold value may include the OBSS PD_Min threshold or the OBSS PD_Max threshold used for spatial reuse by the wireless devices in the second OBSS 210b. In some implementations, the SR information may be included in an SR permission element in the SR element. In some other implementations, the SR information may be included in an SR parameter set element in the SR element.

At 406, the first AP may transmit the SR element that includes the SR information. For example, referring to FIG. 2A, the first AP 202a may transmit (at 205) the SR element that includes the SR information.

At 408, the first AP may to receive a first message from a second AP. In some implementations, the first message may indicate that the second AP intends to join an SRG associated with the first AP. For example, referring to FIG. 2A, the first AP 202a may receive (at 209) a first message indicating that the second AP 202b will comply with the at least one first OBSS threshold value and that wireless devices in the second OBSS 210b may reuse the resources over the first AP 202a.

At 410, the first AP may include the second AP in the SRG. For example, referring to FIG. 2A, when the first message is received by the first AP 202a, when the first message is received (at 209) by the first AP 202a, the first AP 202a may include (at 211) the second AP 202b in the SRG. The first AP 202a may include (at 211) the second AP 202b in the SRG by updating a color bitmap to assign the second OBSS 210b the same color as the first OBSS 210a.

At 412, the first AP may receive a first message from a second AP. In some implementations, the first message may indicate at least one second OBSS threshold value for reuse of the resources over the second AP. For example, referring to FIG. 2A, the first message (transmitted at 209) may include information associated with at least one second OBSS threshold value associated with reuse of the resources over the second AP 202b.

At 414, the first AP may update the at least one first OBSS threshold value to match the at least one second OBSS threshold value. For example, referring to FIG. 2A, the first AP 202a may update (at 213) the at least one first OBSS threshold value based on the at least one second OBSS threshold value associated with reuse of the resources over the second AP 202b. For example, when the at least one second OBSS threshold value is more conservative (such as including a narrower OBSS threshold value range) than the at least one first OBSS threshold value, the first AP 202a may update (at 213) the at least one first OBSS threshold value to match the at least one second OBSS threshold value.

At 416, the first AP may transmit a second message to the second AP indicating the updated at least one first OBSS threshold value. For example, referring to FIG. 2A, the first AP 202a may transmit (at 215) a second message that indicates the updated at least one first OBSS threshold value to the second AP 202b.

Figure 5:
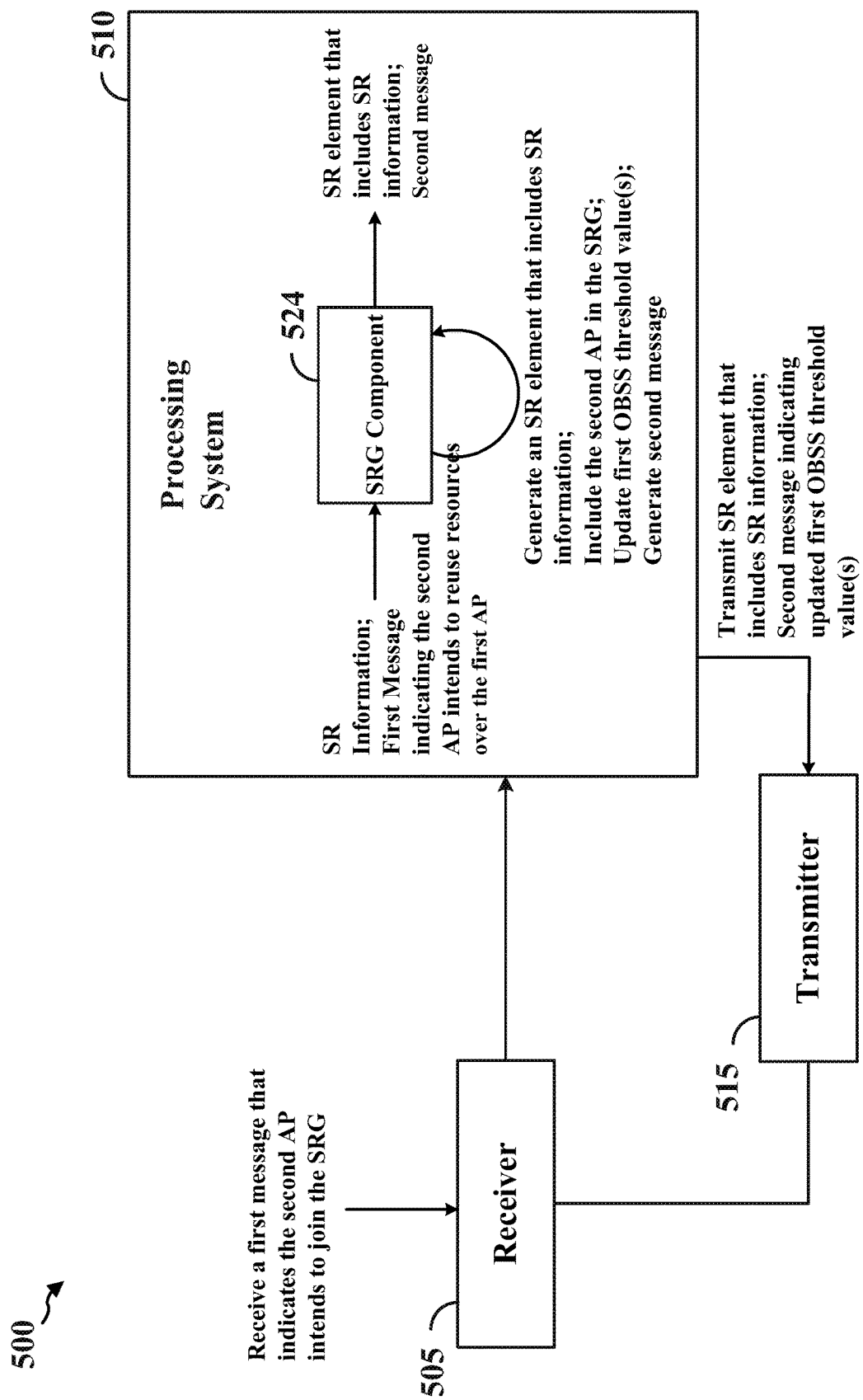
FIG. 5 is a functional block diagram of an example wireless communication device that may be configured to reuse over transmissions of a first AP in accordance with certain aspects of the present disclosure.

FIG. 5 is a functional block diagram of an example wireless communication device 500 that may enable reuse of resources by another AP within the wireless communication system 100 of FIG. 1. The wireless communication device 500 may include a receiver 505, a processing system 510, and a transmitter 515. The processing system 510 may include a SRG component 524.

The processing system 510, the SRG component 524, or the transmitter 515 may be configured to generate an SR element that includes SR information. In some implementations, the SR information indicating that a first group of STAs associated with a second AP may reuse resources that are used for packets transmitted by a second group of STAs associated with the first AP. Such reuse of the resources may be described as reuse over the first AP. In some other implementations, the SR information may include at least one first permitted OBSS threshold value for reuse of the resources over the first AP. In some other implementations, the SR element may be carried in a beacon, a probe response, or an action frame. In some other implementations, the SR element may further include an SRG identifier field. In some other implementations, an SRG identifier associated with the first AP may be included in the SRG identifier field when the at least one first permitted OBSS threshold value included in the SR information is associated with a plurality of different SRGs. In some other implementations, the SR information may be included in an SR permission element. In some other implementations, the SR information may be included in an SR parameter set element. The processing system 510, the SRG component 524, or the transmitter 515 may be configured to transmit the SR element that includes the SR information. The processing system 510, the SRG component 524, or the receiver 505 may be configured to receive a first message from a second AP. In some implementations, the first message may indicate that the second AP intends to join an SRG associated with the first AP. The processing system 510, the SRG component 524, the receiver 505, or the transmitter 515 may be configured to include the second AP in the SRG. The processing system 510, the SRG component 524, or the receiver 505 configured to receive a first message from a second AP. In some implementations, the first message may indicate at least one second OBSS threshold value associated with the second AP. The processing system 510, the SRG component 524, or the receiver 505 may be configured to update the at least one first OBSS threshold value to match the at least one second OBSS threshold value. The processing system 510, the SRG component 524, or the transmitter 515 may be configured to transmit a second message to the second AP indicating the updated at least one first OBSS threshold value. The processing system 510, the SRG component 524, or the transmitter 515 may be configured to receive an SR information request from the second AP. In some implementations, the SR element may be generated in response to the SR information request.

The processing system 510, the SRG component 524, receiver 505, or the transmitter 515 may be configured to perform one or more functions discussed above with respect to blocks 402, 404, 406, 408, 410, 412, 414, 416 of FIG. 4. The receiver 505 may correspond to the receiver 312. The processing system 510 may correspond to the processor 304. The transmitter 515 may correspond to the transmitter 310. The SRG component 524 may correspond to the SRG component 124 or SRG component 324.

In some implementations, the wireless communication device 500 may include means for generating (such as the processing system 510, the SRG component 524, or the transmitter 515) an SR element that includes SR information. In some implementations, the SR information indicating that a first group of STAs associated with a second AP may reuse the resources that are used for packets transmitted by a second group of STAs associated with the first AP. In some other implementations, the SR information may include at least one first permitted OBSS threshold value for reuse of the resources over the first AP. In some other implementations, the SR element may be carried in a beacon, a probe response, or an action frame. In some other implementations, the SR element may further include an SRG identifier field. In some other implementations, an SRG identifier associated with the first AP may be included in the SRG identifier field when the at least one first permitted OBSS threshold value included in the SR information is associated with a plurality of different SRGs. In some other implementations, the SR information may be included in an SR permission element. In some other implementations, the SR information may be included in an SR parameter set element. In some implementations, the wireless communication device 500 may include means for transmitting (such as the processing system 510, the SRG component 524, or the transmitter 515) the SR element that includes the SR information. In some implementations, the wireless communication device 500 may include means for receiving (such as the processing system 510, the SRG component 524, or the receiver 505) a first message from a second AP. In some implementations, the first message may indicate that the second AP intends to reuse the resources over the first AP. In some implementations, the wireless communication device 500 may include means for including (such as the processing system 510, the SRG component 524, receiver 505, or the transmitter 515) the second AP in the SRG. In some other implementations, the wireless communication device 500 may include means for receiving (such as the processing system 510, the SRG component 524, or the receiver 505) a first message from a second AP. In some implementations, the first message may indicate at least one second OBSS threshold value associated with the second AP. In some implementations, the wireless communication device 500 may include means for updating (such as the processing system 510, the SRG component 524, or the receiver 505) the at least one first OBSS threshold value to match the at least one second OBSS threshold value. In some implementations, the wireless communication device 500 may include means for transmitting (such as the processing system 510, the SRG component 524, or the transmitter 515) transmit a second message to the second AP indicating the updated at least one first OBSS threshold value. In some other implementations, the wireless communication device 500 may include means for receiving (such as the processing system 510, the SRG component 524, or the receiver 505) an SR information request from the second AP. In some implementations, the SR element may be generated in response to the SR information request.

Figure 6:
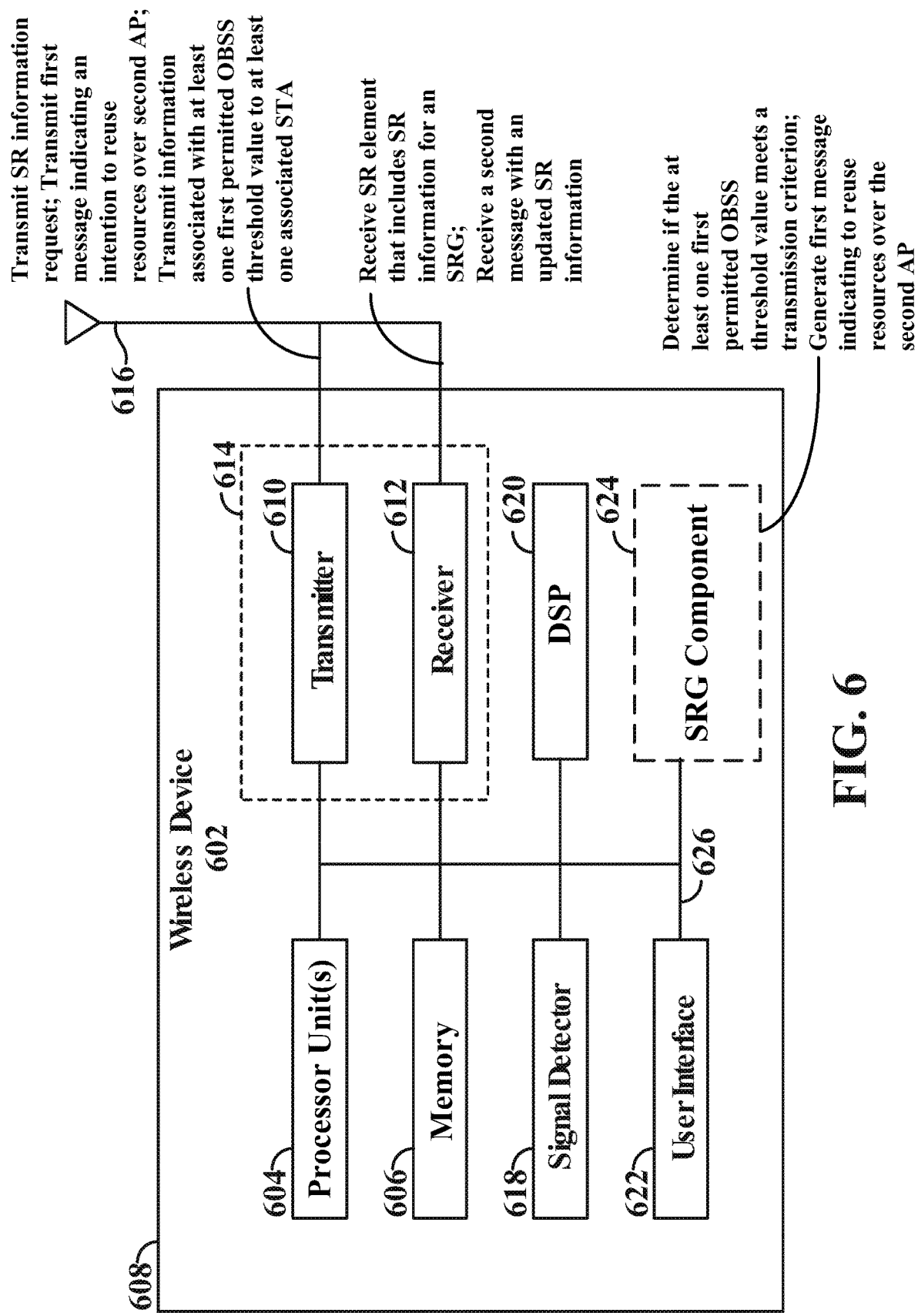
FIG. 6 shows an example functional block diagram of a wireless communication device that may be configured to reuse over another AP within the wireless communication system of FIG. 1.

FIG. 6 shows an example functional block diagram of a wireless communication device 602 that may be configured to enable reuse resources over another AP within the wireless communication system 100 of FIG. 1. The wireless communication device 602 is an example of a device that may be configured to implement the various methods described herein. For example, the wireless communication device 602 may correspond to, such as AP 120, second AP 202b, the wireless communication device 800.

The wireless communication device 602 may include a processor 604 which controls operation of the wireless communication device 602. The processor 604 also may be referred to as a central processing unit (CPU). Memory 606, which may include both read-only memory (ROM) and random-access memory (RAM), may provide instructions and data to the processor 604. A portion of the memory 606 also may include non-volatile random-access memory (NVRAM). The processor 604 may perform logical and arithmetic operations based on program instructions stored within the memory 606. The instructions in the memory 606 may be executable (by the processor 604, for example) to implement the methods described herein.

The processor 604 may include or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system also may include machine-readable media for storing software. Software shall be construed broadly to mean any type of instructions, whether referred to as software, firmware, middleware, microcode, hardware description language, or otherwise. Instructions may include code (such as in source code format, binary code format, executable code format, or any other suitable format of code). The instructions, when executed by the one or more processors, may cause the processing system to perform the various functions described herein.

The wireless communication device 602 also may include a housing 608, and the wireless communication device 602 may include a transmitter 610 or a receiver 612 to allow transmission and reception of data between the wireless communication device 602 (such as an AP) and a remote device (such as an AP, a STA, etc.). The transmitter 610 and the receiver 612 may be combined into a transceiver 614. An antenna 616 may be attached to the housing 608 and electrically coupled to the transceiver 614. The wireless communication device 602 also may include multiple transmitters, multiple receivers, multiple transceivers, or multiple antennas.

The wireless communication device 602 also may include a signal detector 618 that may be used to detect and quantify the level of signals received by the transceiver 614 or the receiver 612. The signal detector 618 may detect such signals as total energy, energy per subcarrier per symbol, power spectral density, and other signals. The wireless communication device 602 also may include a DSP 620 for use in processing signals. The DSP 620 may be configured to generate a packet for transmission. In some aspects, the packet may include a PPDU.

The wireless communication device 602 may further include a user interface 622 in some aspects. The user interface 622 may include a keypad, a microphone, a speaker, or a display. The user interface 622 may include any element or component that conveys information to a user of the wireless communication device 602 or receives input from the user.

When the wireless communication device 602 is implemented as an AP (such as the AP 120, second AP 202b, wireless communication device 800), the wireless communication device 602 also may include an SRG component 624. For example, the wireless communication device 602 may include an SRG component 624 configured to perform procedures related to reusing over another AP (such as AP 104, the first AP 202a, the wireless communication device 302, 500). In this example, the SRG component 624 may be configured to receive, from a second AP, an SR element that includes SR information. In some implementations, the SR information may include at least one first permitted OBSS threshold value for reuse of resources over the second AP. In some other implementations, the SR element may be carried in a beacon, a probe response, or an action frame. In some other implementations, the SR element may further include an SRG identifier field. In some other implementations, an SRG identifier associated with the second AP may be included in the SRG identifier field when the at least one first permitted OBSS threshold value included in the SR information is associated with a plurality of different SRGs. In some other implementations, the SR information may be included in an SR permission element. In some other implementations, the SR information may be included an SR parameter set element. In some implementations, the SRG component 624 may be configured to determine if the at least one first permitted OBSS threshold value meets a transmission criterion. In some implementations, the transmission criterion may be associated with one or more of an interference level or transmission power. In some other implementations, the SRG component 624 may be configured to transmit a first message to the second AP. In some implementations, the first message may indicate that the first AP intends to reuse resources over the second AP. In some other implementations, the SRG component 624 may be configured to transmit information associated with the at least one first permitted OBSS threshold value to at least one STA upon determining that the at least one first permitted OBSS threshold value meets the transmission criterion. In some other implementations, the SRG component 624 may be configured to transmit a first message to the second AP. In some implementations, the first message may indicate at least one second OBSS threshold value associated with reuse of the resources over the second AP. In some other implementations, the SRG component 624 may be configured to receive a second message to the second AP indicating the updated at least one first OBSS threshold value. In some other implementations, the SRG component 624 may be configured to transmit an SR information request to the second AP. In some implementations, the SR element may be received in response to the SR information request. In some other implementations, the SRG component 624 may be configured to monitor for the SR element.

The various components of the wireless communication device 602 may be coupled together by a bus system 626. The bus system 626 may include a data bus, for example, as well as a power bus, a control signal bus, and a status signal bus in addition to the data bus. Components of the wireless communication device 602 may be coupled together or accept or provide inputs to each other using some other mechanism.

Although a number of separate components are illustrated in FIG. 6, one or more of the components may be combined or commonly implemented. For example, the processor 604 may be used to implement the functionality described above with respect to the processor 604, but also to implement the functionality described above with respect to the signal detector 618, the DSP 620, the user interface 622, or the SRG component 624. Further, each of the components illustrated in FIG. 6 may be implemented using a plurality of separate elements.

Figure 7:
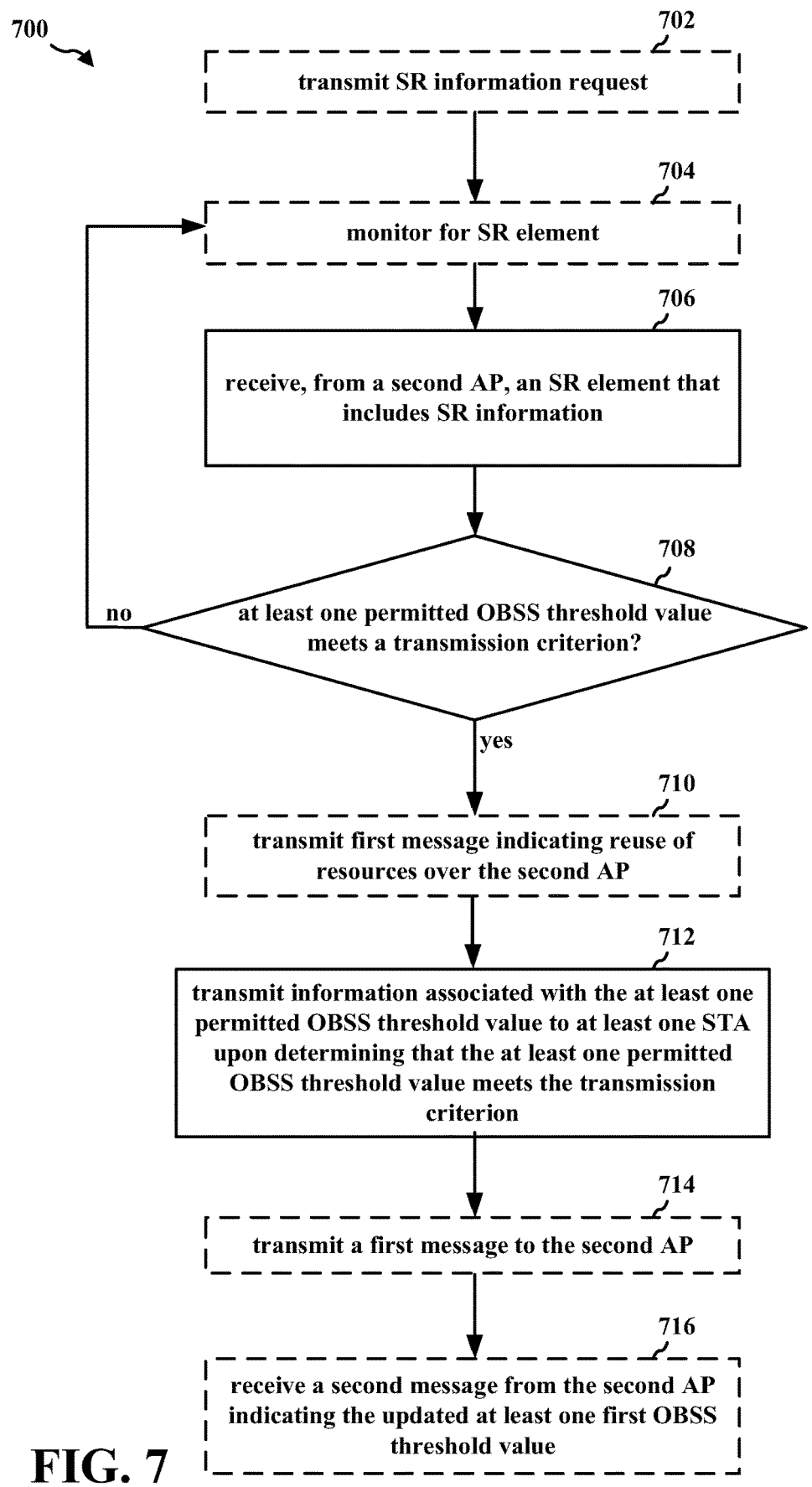
FIG. 7 is a flowchart of an example method for reusing over another AP in accordance with certain aspects of the present disclosure.

FIG. 7 is a flowchart of an example method 700 of reusing over another AP in accordance with certain aspects of the disclosure. The method 700 may be performed using a first AP ((such as the AP 104, 120, the first AP 202*a*, the second AP 202*b*, the wireless communication device 302, 500, 602, 800) in communication with a second AP (such as the AP 104, 120, the first AP 202*a*, the second AP 202*b*, the wireless communication device 302, 500, 602, 800). In FIG. 7, optional operations are indicated with dashed lines.

At 702, the first AP may transmit an SR information request to the second AP. In some implementations, an SR element may be received in response to the SR information request. For example, referring to FIG. 2, the SR element generated (at 203) may be carried in a probe response frame when an SR information request 221 (such as probe request frame) that requests SR information is received from the second AP 202*b*.

At 704, the first AP may monitor for the SR element. For example, referring to FIG. 2, the second AP 202*b* may monitor for the SR element once the SR information request 221 is transmitted to the first AP 202*a*.

At 706, the first AP may receive, from a second AP, an SR element that includes SR information. In some implementations, the SR information may indicate that reuse of resources used to transmit packets by the first AP is available to wireless devices in an OBSS associated with the first AP. Such reuse of the resources may be described as reuse over the first AP. In some other implementations, the SR element may be carried in a beacon, a probe response, or an action frame. In some other implementations, the SR element may further include an SRG identifier field. In some other implementations, an SRG identifier associated with the second AP may be included in the SRG identifier field when the at least one first permitted OBSS threshold value included in the SR information is associated with a plurality of different SRGs. In some other implementations, the SR information may be included in an SR permission element. In some other implementations, the SR information may be included an SR parameter set element. For example, referring to FIG. 2A, the second AP 202*b* may receive (at 205) the SR element that includes the SR information from the first AP 202*a*.

At 708, the first AP may determine if the at least one first permitted OBSS threshold value meets a transmission criterion. In some implementations, the transmission criterion may be associated with one or more of an interference level or transmission power. For example, referring to FIG. 2A, the second AP 202*b* may determine (at 207) if the at least one first permitted OBSS threshold value meets a transmission criterion. The transmission criterion may be associated with a tolerated interference level, a range of transmission powers, or system overhead associated with the second OBSS 210*b*. For example, the second AP 202*b* may determine (at 207) if the at least one first permitted OBSS threshold value meets a transmission criterion by comparing the OBSS threshold value with the transmission criterion. When the OBSS threshold value is within the tolerated interference level or range of transmission powers for wireless devices within the second OBSS 210*b*, the second AP 202*b* may determine (at 207) to reuse the resources over the first AP 202*a* or to join a the SRG associated with the first AP 202*a*. Because the threshold criterion of the second AP 202*b* complies with the OBSS threshold value(s) of the first AP 202*a*, it follows that the OBSS threshold value(s) of the second AP 202*b* will also comply with the threshold criterion of the first AP 202*a*. Otherwise, when the OBSS threshold value is outside the tolerated interference level or range of transmission powers for the second OBSS 210*b*, the second AP 202*b* may determine (at 207) not to reuse the resources over the first AP 202*a* or to join the SRG associated with the first AP 202*a*.

Upon determining (at 708) that the at least one permitted OBSS threshold value does not meet a threshold criterion, the operation may return to 704 where the first AP monitors for an SR element including SR information. Upon determining (at 708) that the at least one permitted OBSS threshold value does meet a threshold criterion, the operation may move to 710.

At 710, the first AP may transmit a first message to the second AP. In some implementations, the first message may indicate that the first AP intends to reuse the resources over the second AP. For example, referring to FIG. 2A, the second AP 202*b* may transmit (at 209) a first message indicating that the second AP 202*b* will comply with the at least one first OBSS threshold value and that wireless devices in the second OBSS 210*b* may reuse the resources over the first AP 202*a*.

At 712, the first AP may transmit information associated with the at least one permitted OBSS threshold value to at least one STA upon determining that the at least one permitted OBSS threshold value meets the transmission criterion. For example, referring to FIG. 2A, the second AP 202*b* may transmit (at 217) the SR information associated with the at least one first permitted OBSS threshold value to at least one STA 204*b* (such as a first group of STAs) upon determining (at 207) that the at least one first permitted OBSS threshold value meets the transmission criterion. Additionally, or alternatively, the second AP 202*b* may the updated at least one first permitted OBSS threshold value or the at least one second OBSS threshold value for reuse of the resources over the second AP 202*b* to the at least one STA 204*b*.

At 714, the first AP may transmit a first message to the second AP. In some implementations, the first message may indicate at least one second OBSS threshold value associated with reuse of the resources over the second AP. For example, referring to FIG. 2A, the first message (transmitted at 209) may include information associated with at least one second OBSS threshold value associated with reuse of the resources over the second AP 202*b*.

At 716, the first AP may receive a second message from the second AP indicating the updated at least one first OBSS threshold value. For example, referring to FIG. 2A, the first AP 202*a* may transmit (at 215) a second message that indicates the updated at least one first OBSS threshold value to the second AP 202*b*.

Figure 8:
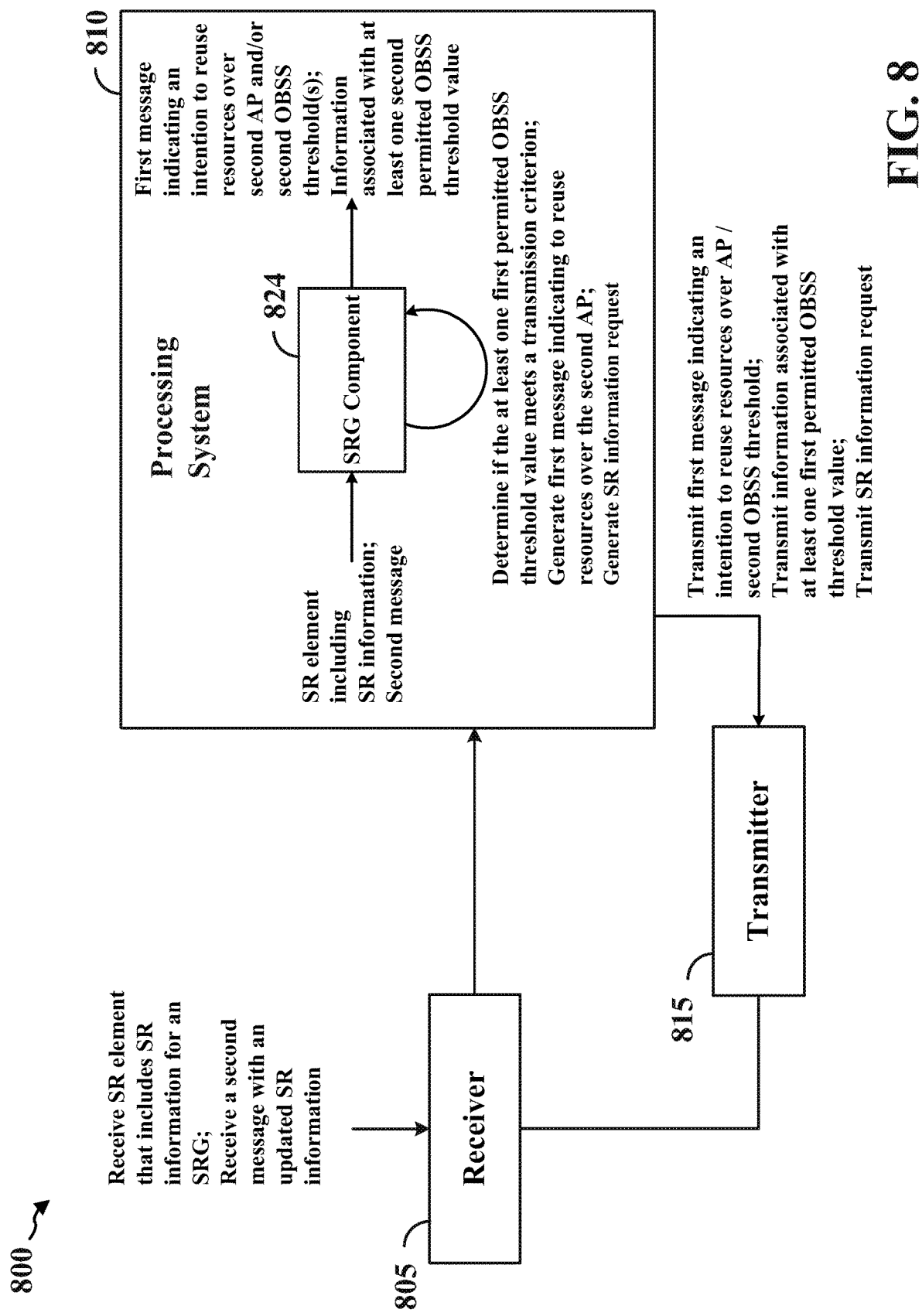
FIG. 8 is a functional block diagram of an example wireless communication device that may be configured to reuse over another AP in accordance with certain aspects of the present disclosure.

FIG. 8 is a functional block diagram of an example wireless communication device 800 that may reuse resources for packets transmitted by another AP within the wireless communication system 100 of FIG. 1. The wireless communication device 800 may include a receiver 805, a processing system 810, and a transmitter 815. The processing system 810 may include a SRG component 824.

The processing system 810, the SRG component 824, or the receiver 805 may be configured to receive, from a second AP, an SR element that includes SR information. In some implementations, the SR information may include at least one first permitted OBSS threshold value. In some other implementations, the SR element may be carried in a beacon, a probe response, or an action frame. In some other implementations, the SR element may further include an SRG identifier field. In some other implementations, an SRG identifier associated with the second AP may be included in the SRG identifier field when the at least one first permitted OBSS threshold value included in the SR information is associated with a plurality of different SRGs. In some other implementations, the SR information may be included in an SR permission element. In some other implementations, the SR information may be included an SR parameter set element. The processing system 810, the SRG component 824, the receiver 805, or the transmitter 815 may be configured to determine if the at least one first permitted OBSS threshold value meets a transmission criterion. In some implementations, the transmission criterion may be associated with one or more of an interference level or transmission power. The processing system 810, the SRG component 824, or the transmitter 815 may be configured to transmit a first message to the second AP. In some implementations, the first message may indicate that the first AP intends to join a SRG associated with the second AP. The processing system 810, the SRG component 824, or the transmitter 815 may be configured to transmit information associated with the at least one first permitted OBSS threshold value to at least one STA upon determining that the at least one first permitted OBSS threshold value meets the transmission criterion. The processing system 810, the SRG component 824, or the transmitter 815 may be configured to transmit a first message to the second AP. In some implementations, the first message may indicate at least one second OBSS threshold value associated with reuse of the resources over the second AP. The processing system 810, the SRG component 824, or the receiver 805 may be configured to receive a second message to the second AP indicating the updated at least one first OBSS threshold value. The processing system 810, the SRG component 824, or the transmitter 815 may be configured to transmit an SR information request to the second AP. In some implementations, the SR element may be received in response to the SR information request. The processing system 810, the SRG component 824, or the receiver 805 may be configured to monitor for the SR element.

The processing system 810, the SRG component 824, receiver 805, or the transmitter 815 may be configured to perform one or more functions discussed above with respect to blocks 702, 704, 706, 708, 710, 712, 714, 716 of FIG. 7. The receiver 805 may correspond to the receiver 612. The processing system 810 may correspond to the processor 604. The transmitter 815 may correspond to the transmitter 610. The SRG component 824 may correspond to the SRG component 126 or SRG component 624.

In some implementations, the wireless communication device 800 may include means for receiving (such as the processing system 810, the SRG component 824, or the receiver 805), from a second AP, an SR element that includes SR information. In some implementations, the SR information may include at least one first permitted OBSS threshold value. In some other implementations, the SR element may be carried in a beacon, a probe response, or an action frame. In some other implementations, the SR element may further include an SRG identifier field. In some other implementations, an SRG identifier associated with the second AP may be included in the SRG identifier field when the at least one first permitted OBSS threshold value included in the SR information is associated with a plurality of different SRGs. In some other implementations, the SR information may be included in an SR permission element. In some other implementations, the SR information may be included an SR parameter set element. In some implementations, the wireless communication device 800 may include means for determining (such as the processing system 810, the SRG component 824, the receiver 805, or the transmitter 815) if the at least one first permitted OBSS threshold value meets a transmission criterion. In some implementations, the transmission criterion may be associated with one or more of an interference level or transmission power. In some implementations, the wireless communication device 800 may include means for transmitting (such as the processing system 810, the SRG component 824, or the transmitter 815) a first message to the second AP. In some implementations, the first message may indicate that the first AP intends to join a SRG associated with the second AP. In some implementations, the wireless communication device 800 may include means for transmitting (such as the processing system 810, the SRG component 824, or the transmitter 815) information associated with the at least one first permitted OBSS threshold value to at least one STA upon determining that the at least one first permitted OBSS threshold value meets the transmission criterion. In some implementations, the wireless communication device 800 may include means for transmitting (such as the processing system 810, the SRG component 824, or the transmitter 815) a first message to the second AP. In some implementations, the first message may indicate at least one second OBSS threshold value associated with reuse of the resources over the second AP. In some implementations, the wireless communication device 800 may include means for receiving (such as the processing system 810, the SRG component 824, or the receiver 805) a second message to the second AP indicating the updated at least one first OBSS threshold value. In some implementations, the wireless communication device 800 may include means for transmitting (such as the processing system 810, the SRG component 824, or the transmitter 815) an SR information request to the second AP. In some implementations, the SR element may be received in response to the SR information request. In some implementations, the wireless communication device 800 may include means for monitoring (such as the processing system 810, the SRG component 824, or the receiver 805) for the SR element.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication for a first access point (AP), comprising:
    generating a spatial reuse (SR) element that includes SR information, the SR information indicating that a first group of stations (STAs) associated with a second AP is allowed to reuse resources that are used for packets transmitted by a second group of STAs associated with the first AP and indicating at least one first permitted overlapping basic service set (OBSS) threshold value for reuse of the resources over the first AP;
    transmitting the SR element that includes the SR information;
    receiving a first message from the second AP, the first message indicating that the second AP complies with the at least one first permitted OBSS threshold value; and
    including the second AP in a spatial reuse group (SRG) associated with the first AP.

2. The method of claim 1, wherein the SR element is carried in one of a beacon, a probe response, an action frame, a beacon report request, or a beacon report response.

3. The method of claim 1, wherein the SR element further comprises an SR group (SRG) identifier field.

4. The method of claim 3, wherein an SRG identifier associated with the first AP is included in the SRG identifier field when the at least one first permitted OBSS threshold value included in the SR information is associated with a plurality of different SR groups (SRGs).

5. The method of claim 1, wherein the SR element is an SR permission element.

6. The method of claim 1, wherein the SR information is included in an SR parameter set element.

7. The method of claim 1, wherein the SR information indicates a partial basic service set identification (BSSID) bitmap.

8. The method of claim 1, wherein the SR information indicates color information for at least an SR group comprising the first AP.

9. The method of claim 1 wherein the first message indicates that the second AP intends to reuse the resources with the first AP.

10. The method of claim 1, further comprising:
    receiving at least one second OBSS threshold value for reuse of the resources over the second AP in the first message from the second AP;
    updating the at least one first permitted OBSS threshold value to match the at least one second OBSS threshold value; and
    transmitting a second message to the second AP indicating the updated at least one first permitted OBSS threshold value.

11. The method of claim 1, further comprising:
    receiving an SR information request from the second AP, wherein the SR element is generated in response to the SR information request.

12. A method of wireless communication for a first access point (AP), comprising:
    receiving, from a second AP, a spatial (SR) element that includes SR information, the SR information comprising at least one first permitted overlapping basic service set (OBSS) threshold value for reuse of resources that are used for packets transmitted by the second AP;
    determining if the at least one first permitted OBSS threshold value meets a transmission criterion;
    transmitting a first message to the second AP, the first message indicating that the second AP complies with the at least one first permitted OBSS threshold value upon determining that the at least one first permitted OBSS threshold value meets the transmission criterion; and
    joining a spatial reuse group (SRG) associated with the second AP.

13. The method of claim 12, wherein the SR element is carried in a beacon, a probe response, an action frame, a beacon report request, or a beacon report response.

14. The method of claim 12, wherein the SR element further includes a spatial reuse group (SRG) identifier field.

15. The method of claim 14, wherein an SRG identifier associated with the second AP is included in the SRG identifier field when the at least one first permitted OBSS threshold value included in the SR information is associated with a plurality of different SR groups (SRGs).

16. The method of claim 12, wherein the SR information is included in an SR permission element.

17. The method of claim 12, wherein the SR information is included an SR parameter set element.

18. The method of claim 12, wherein the transmission criterion is associated with one or more of an interference level or transmission power.

19. The method of claim 12, wherein the first message indicates that the first AP intends to reuse the resources over the second AP.

20. The method of claim 12, further comprising:
    indicating at least one second OBSS threshold value for reuse of the resources over the first AP in the first message to the second AP; and receiving a second message from the second AP indicating an updated at least one first permitted OBSS threshold value.

21. The method of claim 12, further comprising:
transmitting an SR information request to the second AP, wherein the SR element is received in response to the SR information request; and
monitoring for the SR element.

22. An apparatus for wireless communication for a first access point (AP), comprising:
a memory; and
at least one processor coupled to the memory and configured to:
generate a spatial reuse (SR) element that includes SR information, the SR information indicating that a first group of stations (STAs) associated with a second AP is allowed to reuse resources that are used for packets transmitted by a second group of STAs associated with the first AP and indicating at least one first permitted overlapping basic service set (OBSS) threshold value for reuse of the resources over the first AP;
a first interface configured to transmit the SR element that includes the SR information;
a second interface configured to receive a first message from the second AP, the first message indicating that the second AP complies with the at least one first permitted OBSS threshold value; and
include the second AP in a spatial reuse group (SRG) associated with the first AP.

23. The apparatus of claim 22, wherein the SR element is carried in a beacon, a probe response, an action frame, a beacon report request, or a beacon report response, the SR element further comprises an spatial reuse group (SRG) identifier field, and
an SRG identifier associated with the first AP is included in the SRG identifier field when the at least one first permitted OBSS threshold value included in the SR information is associated with a plurality of different SR groups (SRGs).

24. The apparatus of claim 22 wherein
the first message indicates that the second AP intends to reuse the resources with the first AP.

25. The apparatus of claim 22, wherein the second interface is further configured to receive at least one second OBSS threshold value for reuse of the resources over the second AP in the first message from the second AP,
wherein the at least one processor is further configured to update the at least one first permitted OBSS threshold value to match the at least one second OBSS threshold value, and
wherein the first interface is further configured to transmit a second message to the second AP indicating the updated at least one first permitted OBSS threshold value.

26. The apparatus of claim 22, wherein the second interface is configured to receive an SR information request from the second AP, wherein the SR element is generated in response to the SR information request.

27. An apparatus for wireless communication for a first access point (AP), comprising:
a memory; and
a first interface configured to receive, from a second AP, a spatial reuse (SR) element that includes SR information, the SR information comprising at least one first permitted overlapping basic service set (OBSS) threshold value for reuse of resources that are used for packets transmitted by the first AP;
at least one processor coupled to the memory and configured to determine if the at least one first permitted OBSS threshold value meets a transmission criterion; and
a second interface configured to transmit a first message to the second AP, the first message indicating that the second AP complies with the at least one first permitted OBSS threshold value upon determining that the at least one first permitted OBSS threshold value meets the transmission criterion; and
join a spatial reuse group (SRG) associated with the second AP.

28. The apparatus of claim 27, wherein the second interface is further configured to:
first message indicates that the first AP intends to reuse the resources over the second AP.

29. The apparatus of claim 27, wherein the second interface is further configured to indicate at least one second OBSS threshold value for reuse of the resources over the first AP in the first message to the second AP, and
wherein the first interface is further configured to receive a second message from the second AP indicating an updated at least one first permitted OBSS threshold value.

30. The apparatus of claim 27, wherein the second interface is further configured to transmit an SR information request to the second AP, wherein the SR element is received in response to the SR information request, and
wherein the at least one processor is further configured to monitor for the SR element.

\* \* \* \* \*